United States Patent
Aoki et al.

(10) Patent No.: US 9,462,252 B2
(45) Date of Patent: Oct. 4, 2016

(54) SINGLE-EYE STEREOSCOPIC IMAGING DEVICE, IMAGING METHOD AND RECORDING MEDIUM

(71) Applicant: FUJIFILM Corporation, Tokyo (JP)

(72) Inventors: Takashi Aoki, Saitama (JP); Youichi Sawachi, Saitama (JP)

(73) Assignee: FUJIFILM Corporation, Tokyo (JP)

(*) Notice: Subject to any disclaimer, the term of this patent is extended or adjusted under 35 U.S.C. 154(b) by 317 days.

(21) Appl. No.: 14/205,522

(22) Filed: Mar. 12, 2014

(65) Prior Publication Data
US 2014/0192162 A1 Jul. 10, 2014

Related U.S. Application Data

(63) Continuation of application No. PCT/JP2012/070736, filed on Aug. 15, 2012.

(30) Foreign Application Priority Data

Sep. 13, 2011 (JP) ................................. 2011-199709

(51) Int. Cl.
 H04N 13/02 (2006.01)
 G02B 7/34 (2006.01)
 G03B 7/095 (2006.01)
 G03B 13/36 (2006.01)
 G03B 35/10 (2006.01)

(52) U.S. Cl.
 CPC ............ *H04N 13/0203* (2013.01); *G02B 7/34* (2013.01); *G03B 7/095* (2013.01); *G03B 13/36* (2013.01); *G03B 35/10* (2013.01); *H04N 13/0217* (2013.01); *H04N 13/0296* (2013.01)

(58) Field of Classification Search
 CPC ............................. G03B 35/10; H04N 13/0203
 USPC ............................................................ 348/46
 See application file for complete search history.

(56) References Cited

U.S. PATENT DOCUMENTS 6,807,295 B1 * 10/2004 Ono .................... G02B 23/2415
 348/42
8,842,164 B2 9/2014 Kuroki
 (Continued)

FOREIGN PATENT DOCUMENTS

CN 101836432 A 9/2010
JP 2001-16612 A 1/2001
 (Continued)

OTHER PUBLICATIONS

International Preliminary Examination Report (PCT/IPEA/408 and PCT/IPEA/409) dated Jan. 16, 2014.
 (Continued)

*Primary Examiner* — Hung Dang
*Assistant Examiner* — Girumsew Wendmagegn
(74) *Attorney, Agent, or Firm* — Birch, Stewart, Kolasch & Birch, LLP

(57) ABSTRACT

After AE/AF/AWB operation, a subject distance is calculated for each pixel, and a histogram which shows the distance distribution is created based thereon. The class with the highest frequency which is the peak at the side nearer than the focus distance is searched based on the histogram and a rectangular area Ln which includes pixels which have a subject distance within the searched range is set. The average parallax amount Pn which is included in the rectangular area Ln is calculated and it is confirmed whether Pn is within a range of parallax amounts a and a-t1. In a case where Pn is not within a range of parallax amounts a and a-t1 which is set in advance, the aperture value is adjusted such that Pn is within the range of the parallax amounts a and a-t1.

19 Claims, 24 Drawing Sheets

(56) References Cited

U.S. PATENT DOCUMENTS

| | | |
|---|---|---|
| 2010/0245546 A1 | 9/2010 | Kuroki |
| 2010/0259600 A1 | 10/2010 | Yoshikawa |
| 2011/0018972 A1 | 1/2011 | Pan |
| 2012/0057000 A1 | 3/2012 | Rohaly et al. |
| 2012/0320048 A1* | 12/2012 | Yamashita ............ G03B 35/08 345/419 |

FOREIGN PATENT DOCUMENTS

| | | |
|---|---|---|
| JP | 2009-527007 A | 7/2009 |
| JP | 2010-81580 A | 4/2010 |
| JP | 2010-249941 A | 11/2010 |
| JP | 2011-28053 A | 2/2011 |
| WO | WO 2010/050386 A1 | 5/2010 |
| WO | WO 2011/108283 A1 * | 9/2011 ............ G03B 35/08 |
| WO | WO 2011-108283 A1 | 9/2011 |

OTHER PUBLICATIONS

International Search Report, issued in PCT/JP2012/070736, dated Oct. 23, 2012.

Written Opinion of the International Search Authority, issued in PCT/JP2012/070736, dated Oct. 23, 2012.

Chinese Office Action issued in the corresponding Chinese Application No. 201280044391.6, issued on Mar. 24, 2016, with English translations.

* cited by examiner

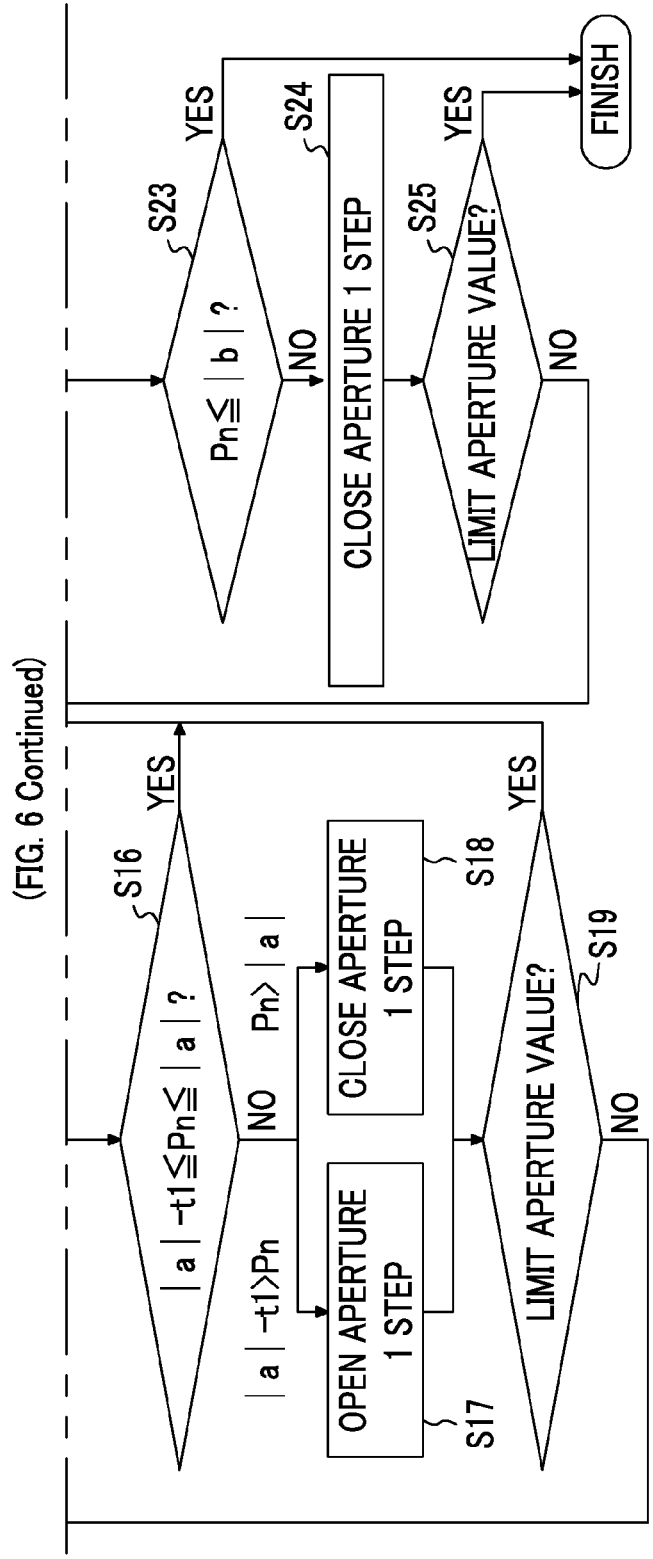

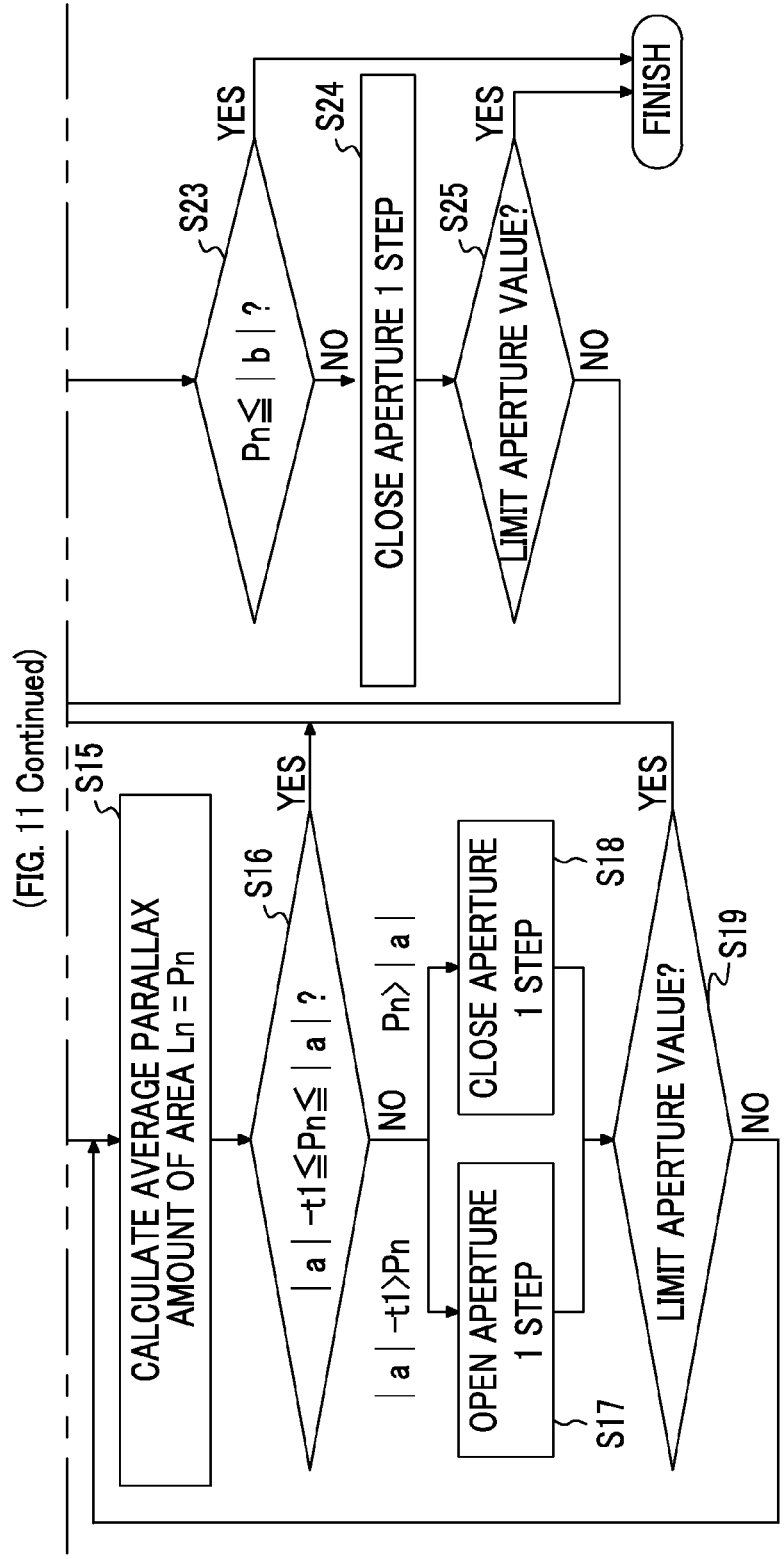

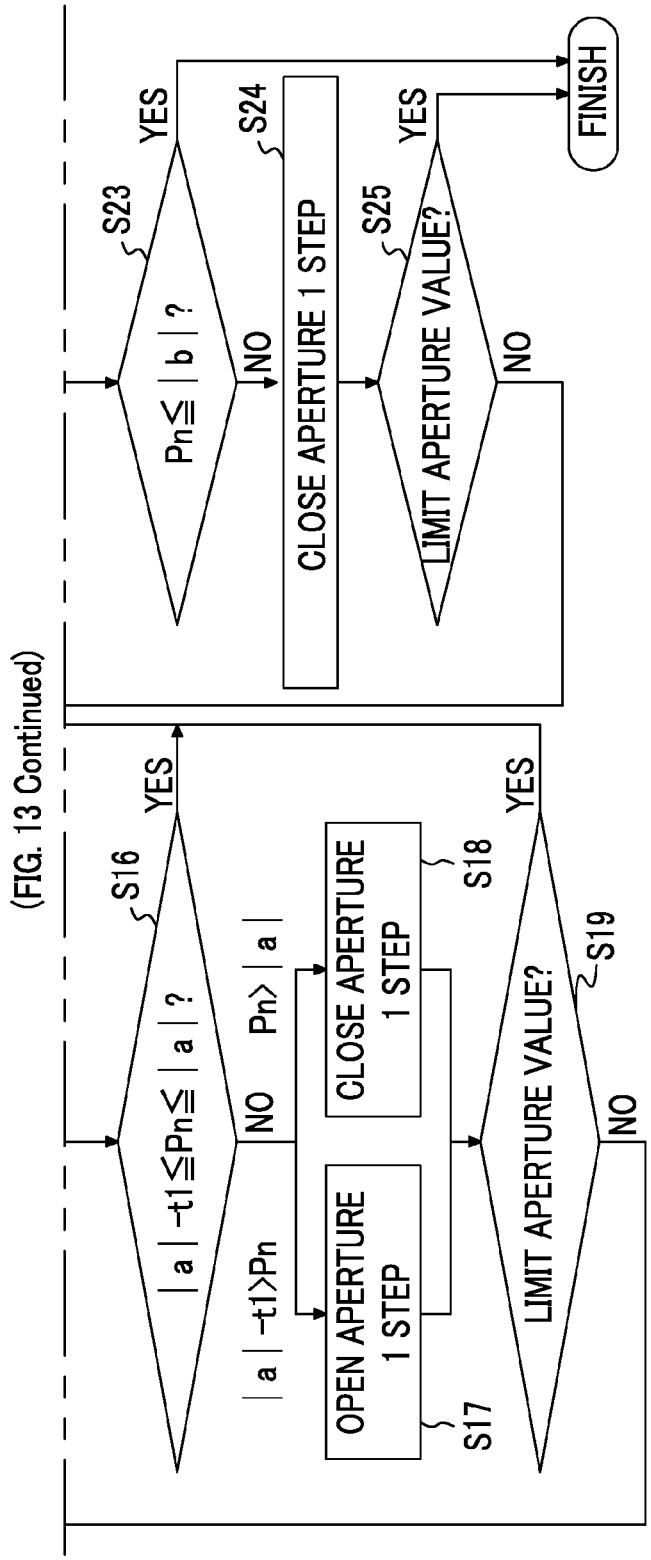

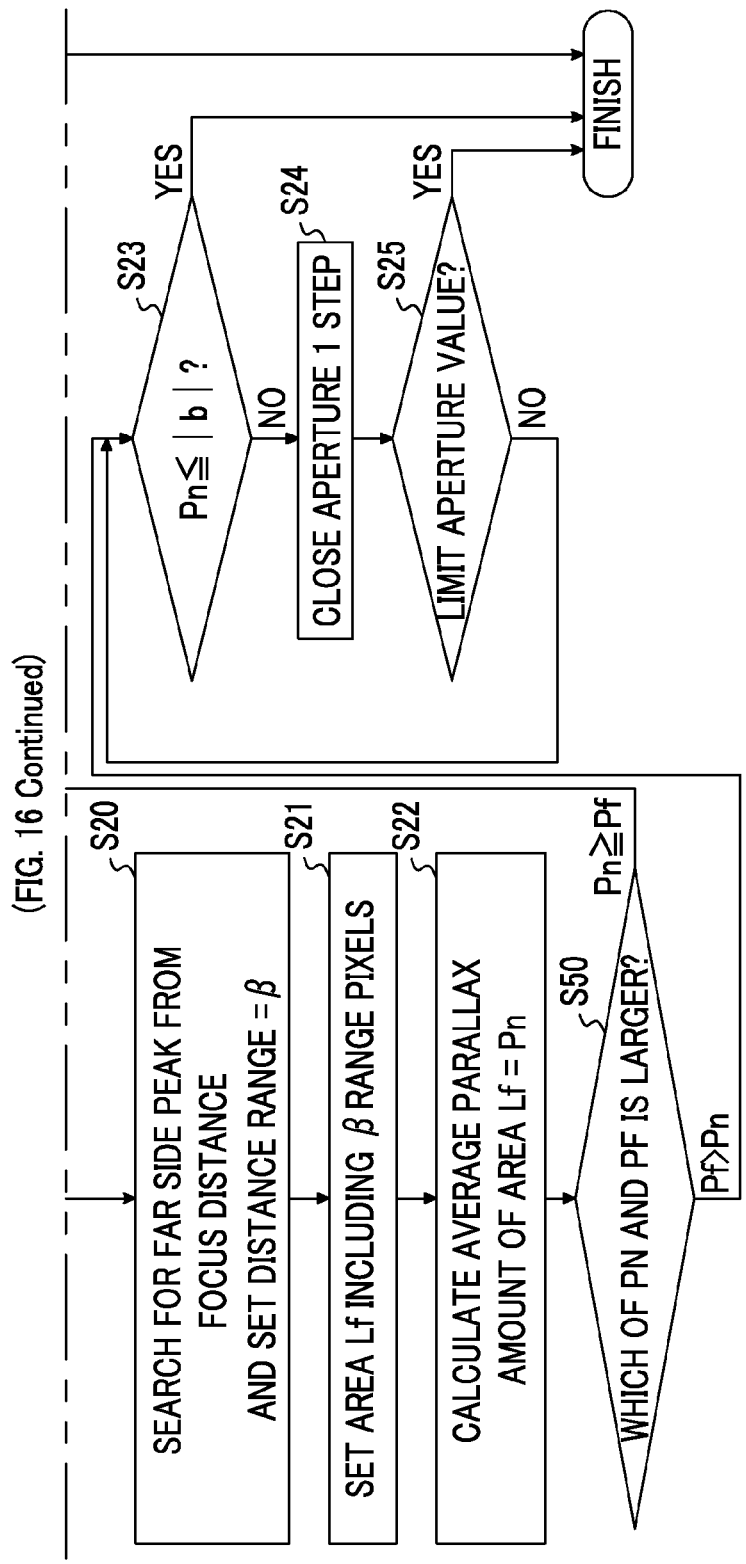
(FIG. 16 Continued)

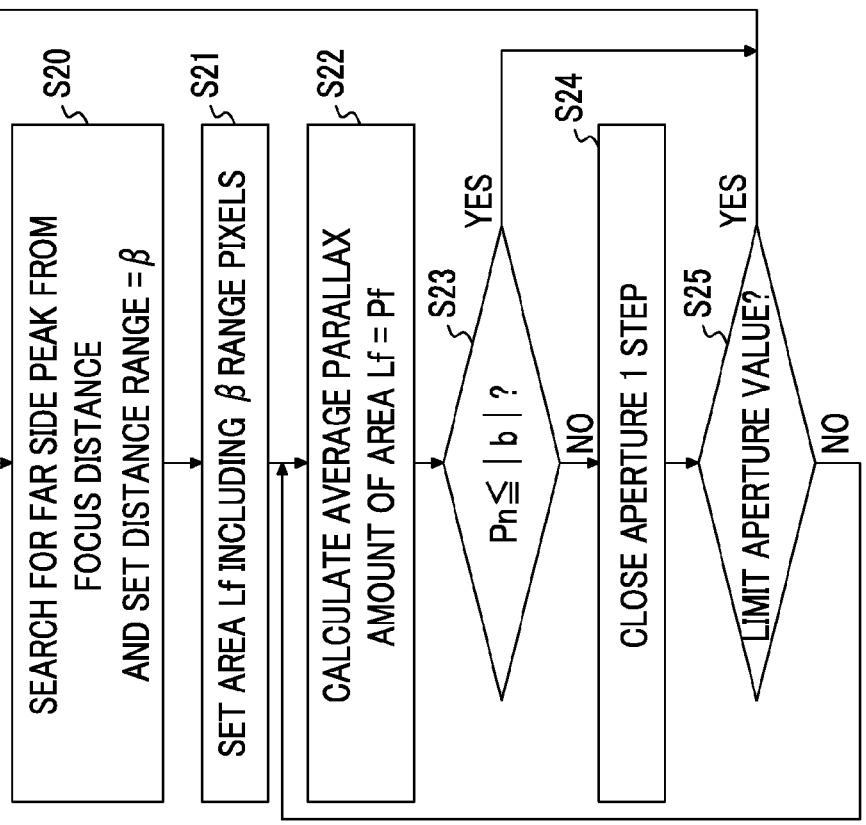

SINGLE-EYE STEREOSCOPIC IMAGING DEVICE, IMAGING METHOD AND RECORDING MEDIUM

CROSS REFERENCE TO RELATED APPLICATIONS

This non-provisional application is a Continuation of International Application No. PCT/JP2012/070736 filed on Aug. 15, 2012, which claims the benefit of Japanese Application No. 2011-199709 filed in Japan on Sep. 13, 2011. The entire contents of all of the above applications are hereby incorporated by reference.

BACKGROUND OF THE INVENTION

1. Field of the Invention

The present invention relates to a single-eye stereoscopic imaging device, an imaging method, and a recording medium, in particular, to a single-eye stereoscopic imaging device, an imaging method, and a program thereof which acquire an image for a left eye and an image for a right eye by capturing subject images which pass through different regions of a single imaging optical system with various imaging elements.

2. Description of the Related Art

JP2009-527007A discloses a single-eye stereoscopic imaging device. In this single-eye stereoscopic imaging device, subject images which pass through different regions of a main lens and a relay lens in the left and right direction are pupil-divided using a mirror, and captured with imaging elements via various capturing lenses.

Images which are in focus out of the pupil-divided images are captured (matched) at the same position on the imaging elements; however, front pin and rear pin images are captured (separated) at different positions on the imaging elements. Accordingly, due to the subject image which is pupil-divided in the left and right direction being acquired via the imaging elements, a left perspective image and a right perspective image with different parallax according to the subject distance are acquired and it is possible to display a stereoscopic image by using the left perspective image and the right perspective image which are acquired.

SUMMARY OF THE INVENTION

However, with the single-eye stereoscopic imaging device described in JP2009-527007A, there are problems in that a stereoscopic effect is automatically determined according to the distance of the subject, and there are cases where an appropriate stereoscopic effect is not achieved.

The present invention is created in consideration of the situation described above and has an object of providing a single-eye stereoscopic imaging device, an imaging method, and a recording medium recorded with a program thereof where imaging is possible with an appropriate stereoscopic effect.

In order to achieve the object described above, a single-eye stereoscopic imaging device according to an aspect of the present invention includes a single imaging optical system, an imaging element which acquires a plurality of images by receiving light beams which each pass through different regions of the imaging optical system, an aperture where it is possible to change an aperture value, distance information acquiring unit which determines a distribution of distance information on subjects which are included in the plurality of images based on the plurality of images, and control unit which controls the aperture value such that a parallax amount of an image region, which is a target of parallax adjustment, is a parallax amount within a predetermined range, based on the distribution of the distance information. Here, there are individual differences in the parallax amounts; however, in the case of children, the parallax is set to a parallax amount within a predetermined range such that the parallax does not exceed 50 mm on the display. In addition, here "distance information on the subjects which are included in the plurality of images based on the plurality of images" refers to information which includes information which relates to parallax.

According to the single-eye stereoscopic imaging device according to the aspect of the present invention, the distribution of distance information on the subjects which are included in the plurality of images which are obtained by receiving light beams which each pass through different regions in a single imaging optical system is determined, and the aperture value is controlled such that a parallax amount of an image region, which is a target of parallax adjustment, is a parallax amount within a predetermined range, based on the distribution of the distance information. Due to this, it is possible to image a parallax image with an appropriate parallax amount.

In a single-eye stereoscopic imaging device according to the aspect of the present invention, the distance information acquiring unit may calculate distance information for each pixel of a standard image which is one image out of a plurality of images, and may create a histogram, in which the first axis is the distance information and the second axis is the number of pixels, where distance information is divided into a plurality of classes for each distance range and the number of pixels, where the distance information which is calculated falls in the ranges of each of the classes, is the frequency. Due to this, it is possible to clarify to what extent a subject at any subject distance accounts for what ratio.

In a single-eye stereoscopic imaging device according to the aspect of the present invention, the distance information acquiring unit may divide a standard image, which is one predetermined image out of a plurality of images, into a plurality of regions, may calculate distance information for each of the divided regions, may divide the distance information into a plurality of classes for each distance range, and may create a histogram, in which the first axis is distance information and the second axis is the number of regions, where the number of regions, where the distance information which is calculated falls in the ranges of each of the classes, is the frequency. Due to this, it is possible to clarify to what extent a subject at any subject distance accounts for what ratio.

In a single-eye stereoscopic imaging device according to the aspect of the present invention, the distance information acquiring unit may calculate distance information for each pixel of the standard image and may calculate the distance information for each of a plurality of regions by calculating the average value of the distance information of the pixels which are included in the regions for each of the divided regions.

In a single-eye stereoscopic imaging device according to the aspect of the present invention, the distance information acquiring unit may calculate the distance information by performing a pattern matching process between the standard image and an image other than the standard image out of the plurality of images.

In a single-eye stereoscopic imaging device according to the aspect of the present invention, the control unit may control the aperture value by setting at least one, in the histogram, of between a subject distance of the subject which is in focus and a subject distance which has a peak in the histogram at the near side (in a direction which approaches the camera) and between a subject distance of the subject which is in focus and a subject distance which has a peak in the histogram at the far side (in a direction which moves away from the camera), as an image region which is a target of parallax adjustment. Due to this, it is possible to appropriately adjust at least one, in the histogram, of between a subject distance of the subject which is in focus and a subject distance which has a peak at the near side and between a subject distance of the subject which is in focus and a subject distance which has a peak in the histogram at the far side.

In a single-eye stereoscopic imaging device according to the aspect of the present invention, the control unit may control the aperture value by setting at least one of the subject which is in focus and a subject with the widest area at the near side from the subject which is in focus and the subject which is in focus and a subject with the widest area at the far side from the subject which is in focus as the image region which is the target of parallax adjustment. Due to this, it is possible to appropriately adjust at least one of a parallax amount of a subject with the widest area at the near side from the subject which is in focus and a subject with the widest area at the far side from the subject which is in focus, or the subject which is in focus and a subject with the widest area at the near side from the subject which is in focus, and a parallax amount of the subject which is in focus and a subject with the widest area at the far side from the subject which is in focus.

In a single-eye stereoscopic imaging device according to the aspect of the present invention, the control unit may determine an image region which is the target of parallax adjustment by targeting regions, which are included in a class where the frequency of the histogram is a threshold or more, out of the plurality of regions which are divided. Due to this, it is possible to determine the subject which is the target of parallax adjustment by targeting only subjects which account for a predetermined range within an image.

In a single-eye stereoscopic imaging device according to the aspect of the present invention, the control unit may control the aperture value and may set the parallax amount between the subject which is in focus and the image region which is the target of parallax adjustment to within a range of constant values. Due to this, it is possible to appropriately set at least one of the parallax amount in a jumping out direction and a parallax amount in a depth direction.

In a single-eye stereoscopic imaging device according to the aspect of the present invention, the distance information acquiring unit may calculate the distance information by adding weightings which differ according to the position of the image. Due to this, it is possible to image parallax images with a stereoscopic effect which better matches the intention of the photographer.

In a single-eye stereoscopic imaging device according to the aspect of the present invention, the imaging optical system may include a focusing lens, and the control unit may set the focusing lens to move such that the parallax of the image region which is the target of the parallax adjustment is a parallax amount within a predetermined range. Due to this, even in a case where it is not possible to finish the adjustment using only the aperture value, it is possible to adjust the parallax amount.

A single-eye stereoscopic imaging method according to another aspect of the present invention includes acquiring a plurality of images by receiving light beams which each pass through different regions in a single imaging optical system, determining the distribution of distance information on subjects which are included in the plurality of images based on the plurality of images, and controlling an aperture value of an aperture such that a parallax amount of an image region, which is a target of parallax adjustment, is a parallax amount within a predetermined range, based on the distribution of the distance information.

A non-transitory computer readable recording medium recorded with a program according to still another aspect of the present invention causing a calculating device to execute acquiring a plurality of images by receiving light beams which each pass through different regions in a single imaging optical system, determining the distribution of distance information on subjects which are included in the plurality of images based on the plurality of images, and controlling an aperture value of an aperture such that a parallax amount of an image region, which is a target of parallax adjustment, is a parallax amount within a predetermined range, based on the distribution of the distance information.

According to the present invention, imaging is possible with an appropriate stereoscopic effect.

DESCRIPTION OF THE PREFERRED EMBODIMENTS

Below, detailed description will be given of preferable aspects for realizing the imaging device according to the present invention with reference to the accompanying diagrams.

First Embodiment

Description of Configuration of Imaging Device

Figure 1:
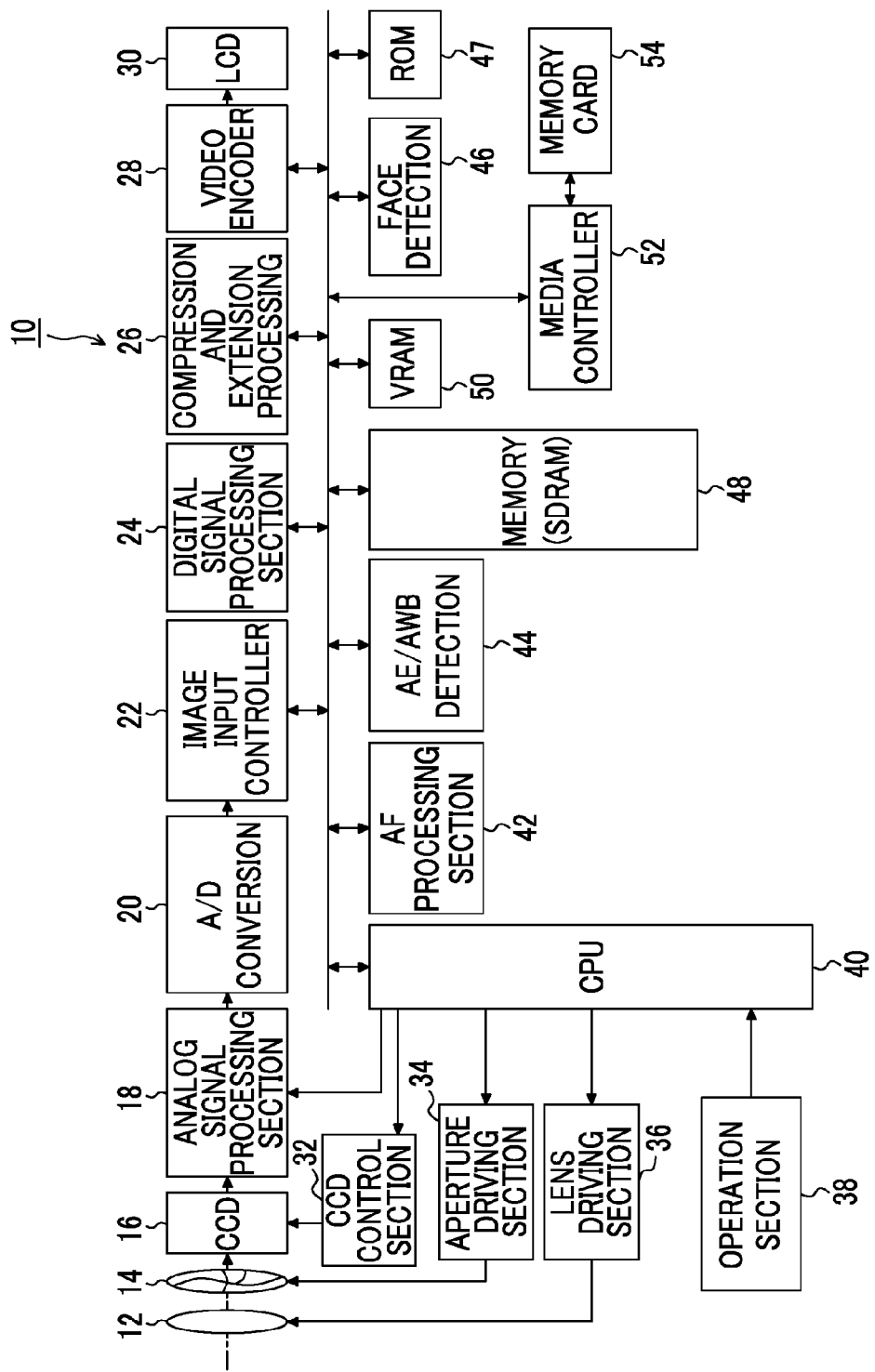
FIG. 1 is a block diagram of a stereoscopic imaging device.

FIG. 1 is a block diagram which shows an embodiment of a single-eye stereoscopic imaging device 10 according to the present invention. The single-eye stereoscopic imaging device 10 is a digital camera which records onto a storage medium by receiving light which passes through a lens with an imaging element and converting the light into a digital signal, and the operations of the apparatus as a whole are generally controlled by a central processing unit (CPU) 40.

The single-eye stereoscopic imaging device 10 is provided with an operation section 38 with a shutter button, a mode dial, a play button, a MENU/OK key, arrow keys, a BACK key, and the like. Signals from the operation section 38 are input to the CPU 40 and the CPU 40 controls each of the circuits of the single-eye stereoscopic imaging device 10 based on the input signal, for example, performing lens driving control, aperture driving control, imaging operation control, image processing control, recording/reproduction control of image data, display control of a liquid crystal monitor 30 for stereoscopic display, and the like.

The shutter button is an operation button for inputting an instruction to start imaging, and is configured by a two stage stroke switch which has an S1 switch which turns on when pressed halfway and an S2 switch which turns on when fully pressed. The mode dial is selection means which selects a two-dimensional imaging mode, a stereoscopic imaging mode, an auto-imaging mode, a manual imaging mode, a scene position mode such as person, landscape, or night view, a macro mode, a video mode, or a parallax priority imaging mode according to the present invention.

The play button is a button for switching the reproduction mode which displays still images or moving images of stereoscopic images or two-dimensional images which were imaged and recorded on the liquid crystal monitor 30. The MENU/OK key is an operation key which functions as a menu button for giving an instruction which displays a menu on the screen of the liquid crystal monitor 30 and functions as an OK button which gives instructions such as confirming and executing selected contents. The arrow keys are operation sections which input instructions in four directions of up, down, left, and right, and function as buttons (cursor moving operation means) which select items from a menu screen or which instruct the selection of various types of set items from each of the menus. In addition, the up/down keys of the arrow keys function as a zoom switch when imaging or a reproduction zoom switch when in a reproduction mode and the left/right keys function as frame-by-frame feeding (forward/reverse feeding) buttons when in the reproduction mode. The BACK key cancels a desired target such as a selection item, deletes instruction content, or is used at times such as when returning to the previous operation state.

When in the imaging mode, image light which shows the subject is captured on a light receiving surface of a phase difference CCD 16 which is a solid-state imaging element via an imaging optical system 12, which includes a focus lens and a zoom lens, and an aperture 14.

The imaging optical system 12 performs focus control, zoom control, and the like by being driven by a lens driving section 36 which is controlled by the CPU 40.

The aperture 14, for example, is formed of five aperture blades, driven by an aperture driving section 34 which is controlled by the CPU 40, and, for instance, is aperture-controlled in six stages from the aperture value F1.4 to F11 in increments of 1 AV. In addition, the CPU 40 performs control or the like of the charge accumulation time (shutter speed) in the phase difference CCD 16 via a CCD control section 32 and of the reading out of image signals from the phase difference CCD 16.

Figure 2:
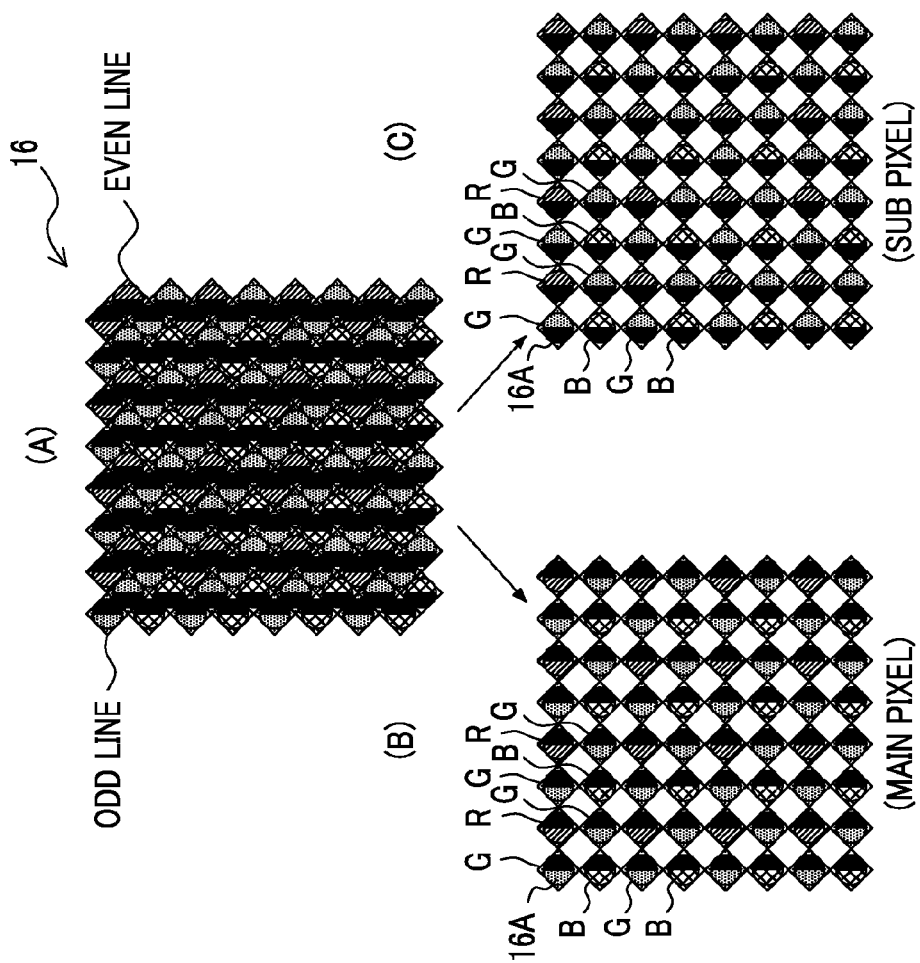
FIG. 2 is a diagram which shows a configuration example of a phase difference image sensor.

FIG. 2 is a diagram which shows a configuration example of the phase difference CCD 16 (a single-eye stereoscopic image element).

The phase difference CCD 16 has pixels (first pixels) of odd numbered lines and pixels (second pixels) of even numbered lines which are each arranged in a matrix form, and, mainly, it is possible for image signals of two planes which are each photoelectrically converted in the second pixels to be read out independently.

Out of the pixels which are provided with R (red), G (green), and B (blue) color filters, lines with a pixel arrangement of GRGR . . . and lines with a pixel arrangement of BGBG . . . are alternately provided in the odd numbered lines (1, 3, 5, . . . ) of the phase difference CCD 16 as shown in FIG. 2, while for the pixels of even numbered lines (2, 4, 6, . . . ), lines with a pixel arrangement of GRGR . . . and lines with a pixel arrangement of BGBG . . . are alternately provided similarly to the odd numbered lines and the pixels are arranged to be shifted in the line direction at a half pitch with regard to the pixels of the even numbered lines.

Figure 3:
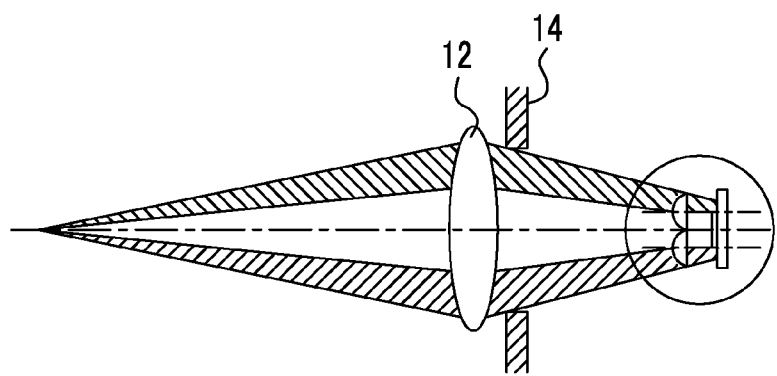
FIG. 3 is a diagram which primarily shows one pixel at a time of second pixels.
Figure 4A:
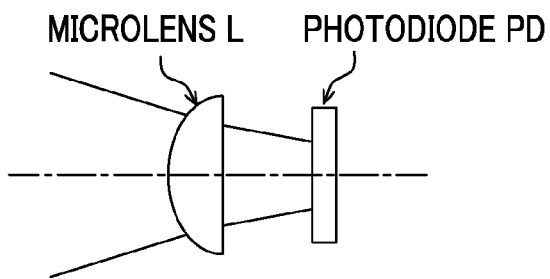
FIG. 4A and FIG. 4B are enlarged diagrams of main parts of FIG. 3.
Figure 4B:
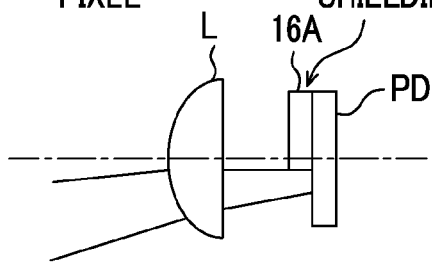

FIG. 3 is a diagram which shows the imaging optical system 12, the aperture 14, and one pixel each of a first pixel PDa and a second pixel PDb of the phase difference CCD 16, and FIG. 4A and FIG. 4B are enlarged diagrams of main parts of FIG. 3.

In the normal CCD pixels (photodiode PD) as shown in FIG. 4A, light beams which pass through the exit pupil are incident without being restricted by a microlens L.

In contrast, as shown in FIG. 4B, a shielding member 16A is formed at a first pixel PDa and a second pixel PDb of the phase difference CCD 16 and the right half or the left half of the light receiving surfaces of the first pixel PDa and the second pixel PDb is shielded by the shielding member 16A. That is, the shielding member 16A has a function as a pupil dividing member.

Here, the phase difference CCD 16 with the configuration described above is configured such that regions (right half and left half) where light beams are restricted by the shielding member 16A are different in the first pixel PDa and the second pixel PDb; however, the present invention is not limited thereto, and the microlens L and the photodiode PD (PDa and PDb) may be relatively shifted in the left and right direction without providing the shielding member 16A and the light beams which are incident to the photodiode PD may be restricted according to the direction of the shifting, in addition, the light beams which are incident to each of the pixels may be restricted by providing one microlens with regard to two pixels (the first pixel and the second pixel).

Returning to FIG. 1, the signal charges which are accumulated in the phase difference CCD 16 are read out as a voltage signal according to a signal charge based on a read out signal which is applied from the CCD control section 32. The voltage signal which is read out from the phase difference CCD 16 is applied to an analog signal processing section 18, whereby the R, G, and B signals for each of the pixels here are sampled and held, and applied to an A/D converter 20 after being amplified at a gain (corresponding to ISO sensitivity) which is specified from the CPU 40. The A/D converter 20 converts the R, G, and B signals which are sequentially input into digital R, G, and B signals, and then outputs these to an image input controller 22.

A digital signal processing section 24 performs predetermined signal processes such as an offset process, gain control processes which include white balance correction and sensitivity correction, a gamma correction process, a synchronization process, a YC process, sharpness correction, and the like with regard to the digital image signals which are input via the image input controller 22.

In addition, an EEPROM 56 is a non-volatile memory which stores a camera control program, defect information of the phase difference CCD 16, various types of parameters or tables to be used in image processes or the like, program line diagrams, a plurality of parallax priority program line diagrams according to the present invention, and the like.

Here, as shown in FIGS. 2(B) and 2(C), the standard image data which is read out from the first pixels of the odd numbered lines of the phase difference CCD 16 is processed as left perspective image data, and the reference image data which is read out from the second pixels of the even numbered lines is processed as right perspective image data.

The left perspective image data and the right perspective image data (stereoscopic image data) which are processed by the digital signal processing section 24 are input to a VRAM 50. The VRAM 50 includes an A region and a B region which each store stereoscopic image data which represents one frame of a stereoscopic image. The stereoscopic image data which represents the one frame of the stereoscopic image is alternately rewritten in the A region and the B region in the VRAM 50. In the A region and the B region of the VRAM 50, the stereoscopic image data which is written is read out from the region other than the region where the stereoscopic image data is being rewritten. The stereoscopic image data which is read out from the VRAM 50 is encoded in a video encoder 28 and output to the liquid crystal monitor 30 (LCD) for stereoscopic display which is provided on the rear surface of the camera, whereby a stereoscopic subject image is displayed on the display screen of the liquid crystal monitor 30.

The liquid crystal monitor 30 is stereoscopic display means which is able to display a stereoscopic perspective image (a left perspective image and a right perspective image) as directive images which each have a predetermined directivity according to a parallax barrier; however, the present invention is not limited thereto, and the liquid crystal monitor 30 may be means which uses a lenticular lens, or means where it is possible to view a left perspective image and a right perspective image independently by the use of dedicated glasses such as polarized glasses, or liquid crystal shutter glasses.

In addition, when the shutter button of the operation section 38 is pressed (halfway pressed) at a first stage, the phase difference CCD 16 starts the AF operation and the AE operation, and controls the focus lens inside the imaging optical system 12 to come to the focus position via the lens driving section 36. In addition, the image data which is read out from the A/D converter 20 when the shutter button is half-pressed is taken in by an AE/AWB detecting section 44.

The AE/AWB detecting section 44 integrates a G signal for the entire screen, or integrates a G signal where different weightings are added at a screen central portion and a peripheral section, and outputs this integrated value to the CPU 40. The CPU 40 calculates the brightness (imaging EV value) of the subject according to the integrated value which is input from the AE/AWB detecting section 44, determines the aperture value of the aperture 14 and an electron shutter (shutter speed) of the phase difference CCD 16 according to a predetermined program line diagram based on the imaging EV value, controls the aperture 14 via the aperture driving section 34 based on the determined aperture value, and controls the charge accumulation time in the phase difference CCD 16 via the CCD control section 32 based on the determined shutter speed.

In addition, the AE/AWB detecting section 44 divides one screen into a plurality of areas (for example, 16×16) and calculates the average integrated value for each color of the image signals of R, G, and B for each area which is divided as the physical amounts which are necessary for the AWB control. The CPU 40 obtains ratios of R/G and B/G for each divided area from the integrated value of R, the integrated value of B, and the integrated value of G, which are obtained, and performs light source type discrimination based on the distribution or the like in the color spaces of R/G and B/G with the obtained R/G and B/G values. According to a white balance adjustment value which is suitable for the light source type which is discriminated, a gain value (a white balance correction value) with regard to the R, and B signals of the white balance adjusting circuit is determined such that, for example, the values of each of the ratios become approximately 1 (in other words, in one screen, the integrated ratio of RGB is R:G:B=1:1:1).

An AF processing section 42 is a portion which performs a contrast AF process or a phase AF process. In a case where a contrast AF process is performed, a high frequency component of the image data inside a predetermined focus region (referred to below as an AF area) is extracted out of at least one of image data of the left perspective image data and the right perspective image data, and an AF evaluation value which indicates the focus state is calculated by integrating the high frequency component. AF control is performed by controlling the focus lens inside the imaging optical system 12 such that the AF evaluation value becomes the maximum. Here, the calculation of the AF evaluation value may use the G signal, or may use another image signal such as a luminance signal (a Y signal). In addition, in a case where the phase difference AF process is performed, a phase difference in the image data which corresponds to the first pixels and the second pixels inside the predetermined AF area out of the left perspective image data and the right perspective image data is detected, and a defocus amount is determined based on information which indicates the phase difference. The AF control is performed by controlling the focus lens inside the imaging optical system 12 such that the defocus amount becomes zero. The AF area is set, for example, as the screen central portion; however, the entire screen may be set as the AF area, or a region in the vicinity of a desired subject (for example, a face) may be set as the AF area. Here, since methods of detecting faces are already well-known, description thereof will be omitted.

Figure 5:
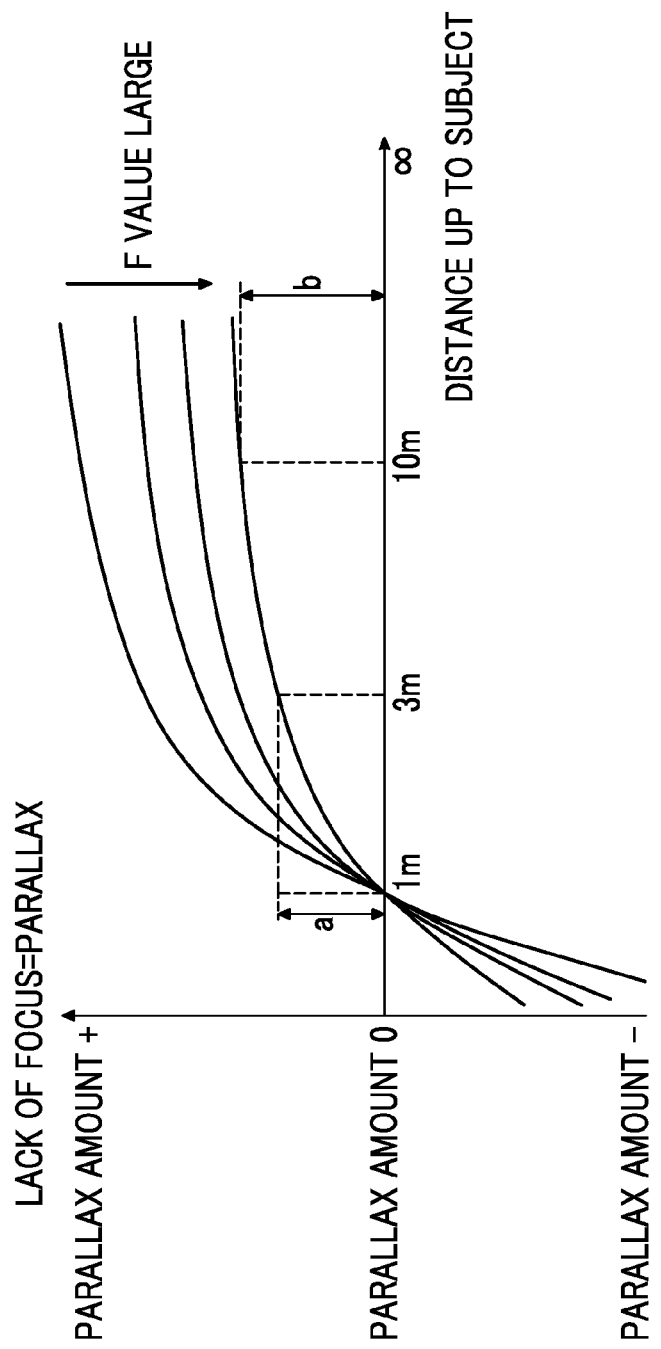
FIG. 5 is a diagram which shows a relationship between a subject distance and a parallax amount.

In the single-eye stereoscopic imaging device 10, since the image which is in focus is captured (matched) at the same position on the phase difference CCD 16, the parallax amount is zero; however, since the images which are not in focus are captured at different positions on the phase difference CCD 16, the parallax amount is applied according to the distance to the subject. FIG. 5 is a graph which shows a relationship between the distance to the subject (referred to below as subject distance) and the parallax, and is a graph of F values which are different in a case where a subject which is at a position of 1 m is in focus. In a case where the F values are the same, when comparing the parallax amount of a subject which is at a position of 3 m and the parallax amount of a subject which is at a position of 10 m, a parallax amount b of the subject which is at 10 m is larger than a parallax amount a of the subject which is at a position of 3 m. Accordingly, depending on the subject distance, cases where the parallax amount is not appropriate are likely to occur. Since the parallax amount is difficult to see when the parallax amount is a constant value or more and it is difficult to obtain a stereoscopic effect when the parallax amount is a constant value or less, control is performed such that the parallax amount is optimum by changing the F value.

Here, in FIG. 5, a parallax amount of 0 has the meaning that there is no parallax, that is, being displayed on a position on the liquid crystal monitor 30 surface. In addition, a + parallax amount has the meaning of parallax in the depth direction from the liquid crystal monitor 30 surface, and a − parallax amount has the meaning of parallax in the jumping out direction (the front side) from the liquid crystal monitor 30 surface.

Even at the same subject distance, the parallax amount is different depending on the F value. When the light beams which are incident on the phase difference CCD 16 are reduced, that is, when the F value is increased, the range of the subject distance which is in focus is widened. In contrast, when the light beams which are incident on the phase difference CCD 16 are increased, that is, when the F value is reduced, the range of the subject distance which is in focus is narrowed. Accordingly, as shown in FIG. 5, the shape of the graph becomes gentler as the F value is increased, that is, the parallax amount between the standard image and the reference image is reduced. In addition, the shape of the graph becomes steeper as the F value is reduced, that is, the parallax amount between the standard image and the reference image is increased.

Here, in FIG. 5, there is a case where the subject at a position of 1 m is in focus; however, for example, in a case where a subject at a position of 3 m is in focus, the graph of FIG. 5 is moved in parallel in the right direction such that the horizontal axis intersects at the point of 3 m.

When the AE operation and the AF operation are finished and the shutter button is pressed to the second stage (fully pressed), image data of two parts of a left eye image (a standard image) and a right eye image (a reference image) which correspond to the first pixels and the second pixels which are output from the A/D converter 20 in response to the pressing is input from the image input controller 22 and temporarily stored in a memory (SDRAM) 48.

The image data of two parts which is temporarily stored in the memory 48 is appropriately read out by the digital signal processing section 24, and predetermined signal processes are performed which include processes (YC processes) which generate luminance data and color-difference data for the image data. The image data (YC data) which is YC processed is stored in the memory 48 again. Subsequently, two parts of YC data are each output to a compression and expansion processing section 26 and stored in the memory 48 again after a predetermined compression process such as JPEG (joint photographic experts group) is performed thereon.

A multi-picture file (MP file: a file format where a plurality of images are linked) is generated from the YC data (compressed data) of two parts which is stored in the memory 48, and the MP file is read out by a media controller 52 and recorded on a memory card 54.

Here, the AF operation is performed not only in a case where the shutter button is pressed to the first stage (pressed halfway), but also in a case where the image data of two parts for the left eye image and the right eye image, that is, right eye image data and left eye image data, are imaged continuously. Examples of a case where the right eye image data and left eye image data are imaged continuously include a case of imaging a live view image (a through image), or a case of imaging a video. In such a case, when continuously imaging the right eye image data and the left eye image data, the AF processing section 42 performs continuous AF which continuously controls the focus lens position by performing repeated calculation of the AF evaluation value or performing detection of the phase difference.

[Description of Operation of Imaging Device]

Next, description will be given of the operation of the single-eye stereoscopic imaging device 10. This imaging process is controlled by the CPU 40. A program for executing this imaging process in the CPU 40 is stored in a program loading section inside the CPU 40.

The subject light which passed through the imaging optical system 12 is captured on a light receiving surface of the phase difference CCD 16 via the aperture 14. According to the CCD control section 32, signal charges which are stored in the first pixels and the second pixels of the phase difference CCD 16 are sequentially read out at a predetermined frame rate as voltage signals (image signals) according to the signal charge, sequentially input to a digital signal processing section 24 via an analog signal processing section 18, the A/D converter 20, and the image input controller 22, and left eye image data and right eye image data are sequentially generated. The left eye image data and the right eye image data which are generated are sequentially input to the VRAM 50.

The CPU 40 changes the aperture value (the F value) which is the opening amount of the aperture 14 via the aperture driving section 34 based on the left eye image data and the right eye image data. In addition, the CPU 40 performs zooming via the lens driving section 36 according to the input from the operation section 38.

It is possible for the photographer to confirm the angle of view by looking at the image (the live view image) which is displayed in real time on the liquid crystal monitor 30.

When the shutter button is half-pressed, an S1ON signal is input to the CPU 40, and the CPU 40 carries out the AE/AF/AWB operations via the AF processing section 42 and the AE/AWB detecting section 44.

Figure 6:
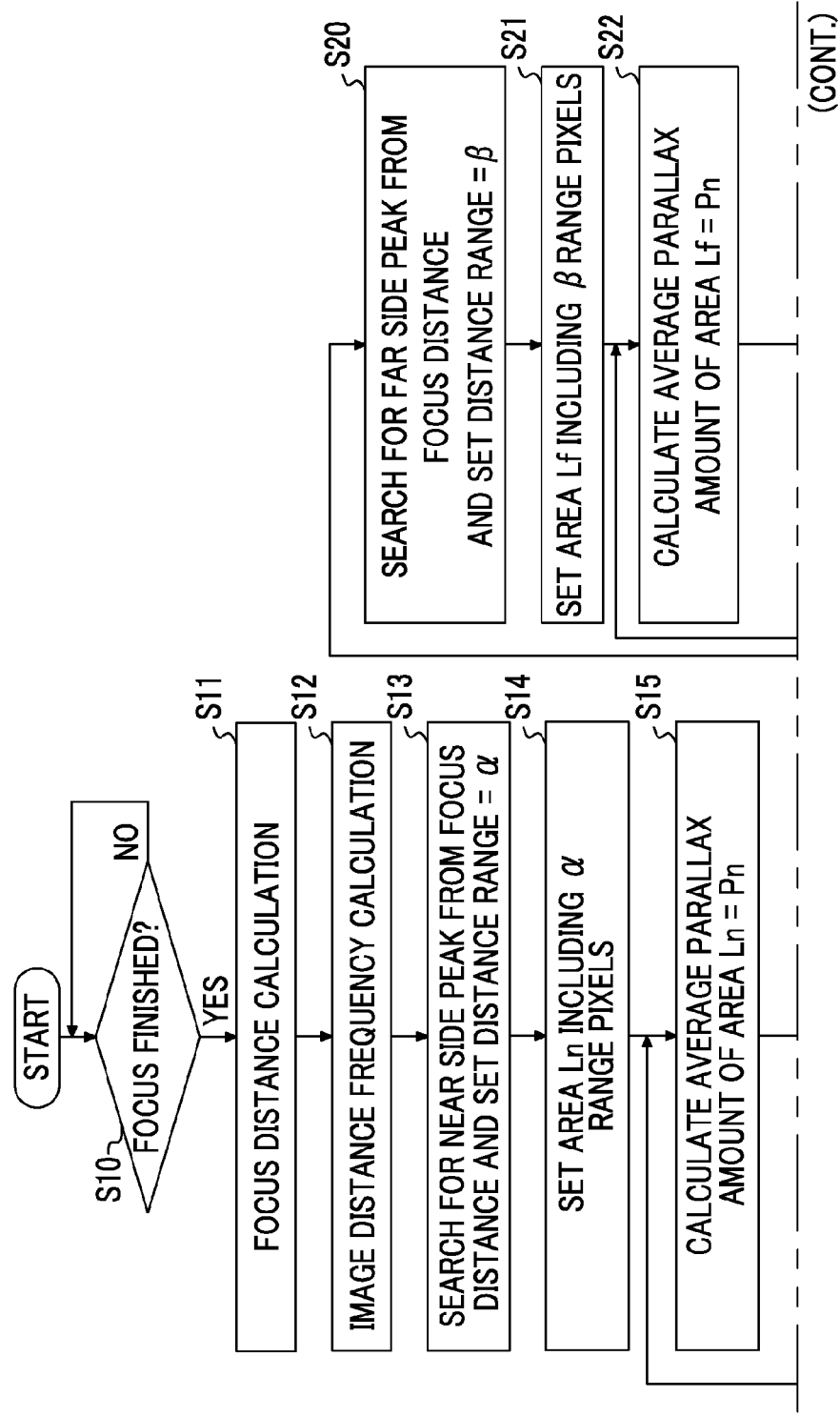
FIG. 6 is a flowchart which shows a flow of a parallax amount adjustment process in a first embodiment.

FIG. 6 is a flowchart which shows a flow of a parallax amount adjustment process which controls the aperture value (the F value) such that the parallax amount between the subject which is closest to the photographer and the subject which is furthest from the photographer is appropriate after the AE/AF/AWB operation. This process is primarily performed by the CPU 40.

The CPU 40 determines whether or not the AF process is finished (step S10). In a case where the AF process is not finished (NO in step S10), step S10 is performed again.

In a case where the AF process is finished (YES in step S10), the subject distance of the subject which is in focus is determined (step S11). It is possible for the subject distance of the subject which is in focus to be calculated from the position of the focus lens. Due to this, a graph which shows the relationship between the distance and the parallax amount which are shown in FIG. 5 is confirmed.

Figure 7:
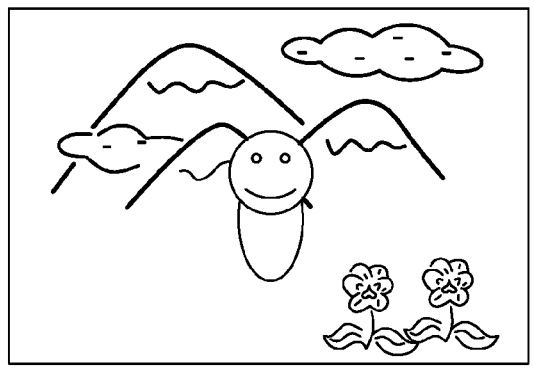
FIG. 7 is an example of an imaging target.

The CPU 40 creates a histogram of the distance frequency (step S12). Description will be given of the process of step S12 with an example of a case where the subject which is shown in FIG. 7 is imaged.

First, the CPU 40 calculates the subject distance for each pixel of the standard image data (or the reference image data, the same applies below). It is possible to determine the subject distance from the phase difference which is obtained by performing the pattern matching process between the standard image and the reference image. In addition, determination is also possible by performing dividing distance measurement for each pixel.

Figure 9:
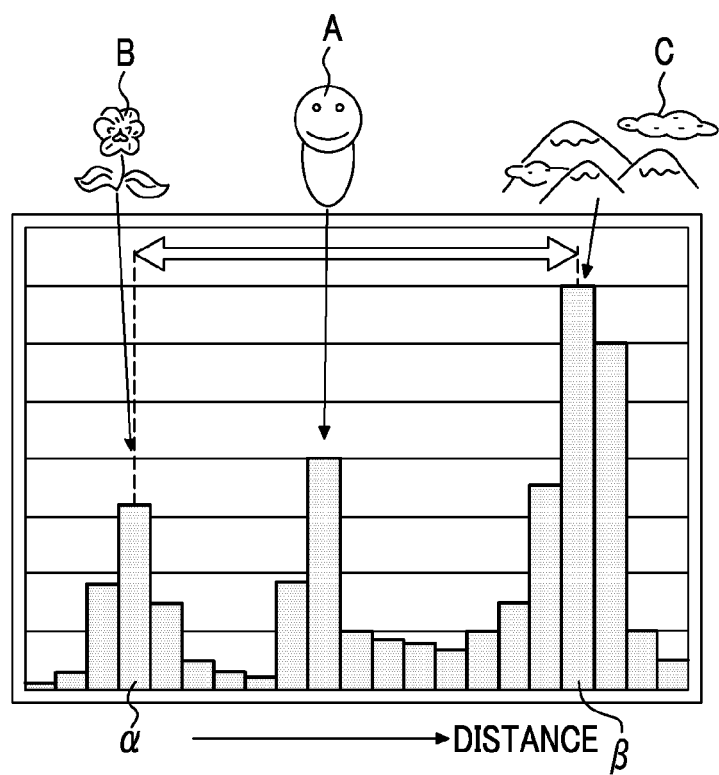
FIG. 9 is a histogram which shows distance distribution when imaging the subject of FIG. 7.

The CPU 40 also functions as the distance information acquiring unit, and creates a histogram using the data which is created. FIG. 9 (8) is a histogram of a case where the subject which is shown in FIG. 7 is imaged. The horizontal axis is the subject distance and is divided into a plurality of classes. In addition, the vertical axis is the number of pixels where the subject distance of each of the pixels which is calculated falls into the range of each of the classes. Due to this, it is possible to obtain the variations in the subject distance, and to what extent a subject at any subject distance accounts for what ratio, that is, the distribution of the distance information of the subject. In a case of the subject which is shown in FIG. 7, it is understood that the configuration primarily has three parts of a focus position (a person A), a subject at a close distance (flowers B), and a subject at a far distance (a background C).

Figure 8:
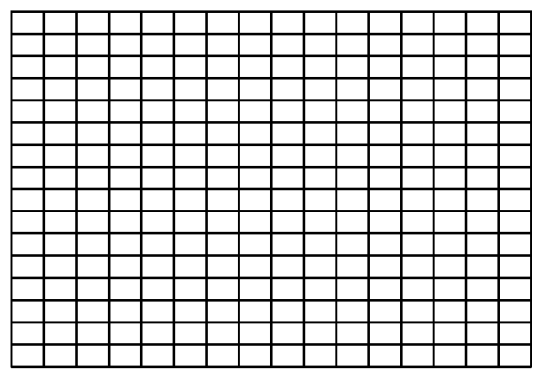
FIG. 8 is an example of region division.

Here, the method of creating a histogram is not limited to this. For example, data which is basis of the histogram may be created by dividing the standard image data into a plurality of regions as shown in FIG. 8 (9) and calculating the average value of the subject distances which are calculated for each of the pixels for each of the regions, and the histogram may be created based on this data. In such a case, the vertical axis is the number of regions where the average value which is calculated falls into the range of each of the classes. The horizontal axis is the subject distance. In addition, the subject distance of the regions may be calculated based on the subject distances which are calculated for each of the pixels, or may be calculated based on the phase difference of the regions. It is possible for the phase difference of the regions to be calculated by performing pattern matching between the standard image data and the reference image data.

Figure 10:
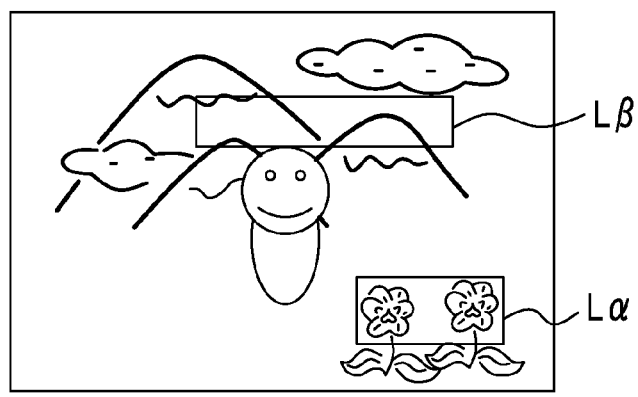
FIG. 10 is an example of standard image data.

The CPU 40 searches for the class with the highest frequency which is the peak at the side which is nearer (in the direction which approaches the camera) than the focus distance (the subject distance of the subject which is in focus) based on the histogram (step S13). In the case shown in FIG. 9, this is $\alpha$. The CPU 40 selects pixels which have a subject distance within a range which is searched in step S13 from the standard image data and the reference image data, and sets a rectangular area Ln which includes these pixels (step S14). Due to this, the nearest subject is set as the target of the parallax adjustment. When the first pixel data which images the subject which is shown in FIG. 7 is set to FIG. 10, a rectangular area L$\alpha$ which includes pixels within a subject distance range of $\alpha$ in FIG. 9 is set in FIG. 10. By setting the rectangular area and limiting the area which is calculated to within a specific range, it is possible to shorten the calculation time.

The CPU 40 calculates the average value (average parallax amount) Pn of the parallax amounts of each of the pixels which are included in the rectangular area Ln which is set in step S14 (step S15). The parallax amount is a shifting amount of the target pixels between the first pixel data and the second pixel data, and is represented by the number of pixels. For example, in a case where the center of the flowers in the first pixel data and the center of the flowers in the second pixel data are shifted by 5 pixels, the parallax amount is 5 pixels. Here, Pn is determined by the absolute value of the parallax amount.

The CPU 40 confirms whether Pn which is calculated in step S15 is within the range of the parallax amounts a and a–t1 which are set in advance (step S16). That is, it is confirmed whether the parallax amount between the subject which is in focus and the nearest subject is within a range of constant parallax amounts a and at1. The parallax amount a is set to a predetermined value within a stereoscopic perspective fusion range. The stereoscopic perspective fusion range is a parallax amount where it is possible for a person to comfortably view the image in three-dimensions, and is a range which is not an excessive parallax or a divergent parallax. These are primarily set from conditions such as the screen size of the stereoscopic display apparatus, and the viewing distance.

In a case where Pn is not within a range of the parallax amounts a and a–t1 which are set in advance (NO in step S16) and where Pn is smaller than the parallax amount a–t1, since the parallax amount is excessively small and an appropriate stereoscopic effect is not obtained in this case, the CPU 40 opens the aperture 14 at a first stage via the aperture driving section 34 and increases the parallax amount (step S17). In addition, in a case where Pn is not within the range of the parallax amounts a and a–t1 which are set in advance (NO in step S16) and where Pn is larger than the parallax amount a, since the stereoscopic effect is excessively strong in this case, the CPU 40 closes the aperture 14 at a first stage via the aperture driving section 34 and reduces the parallax amount (step S18).

As a result, it is determined whether or not the aperture 14 reaches the limit aperture value (step S19). In a case where the limit aperture value is not reached (NO in step S19), since it is possible to adjust the parallax amount, the flow returns to step S15, and the parallax amount is confirmed again.

In a case where Pn is within the range of the parallax amounts a and a–t1 which are set in advance (YES in step S16) and where Pn is the limit aperture value (YES in step S19), the CPU 40 searches for the class with the highest frequency which is the peak at a side which is further (in the direction which moves away from the camera) than the focus distance based on the histogram (step S20). In the case shown in FIG. 9, this is $\beta$. The CPU 40 selects the pixels which have a subject distance within the range which is searched in step S20 from the standard image data and the reference image data, and sets a rectangular area Lf which includes these pixels (step S21). Due to this, the furthest subject is set as the target of parallax adjustment. When the first pixel data which images the subject which is shown in FIG. 7 is set to FIG. 10, a rectangular area L$\beta$ which includes pixels within a subject distance range of $\beta$ in FIG. 9 is set in FIG. 10.

The CPU 40 calculates an average value (an average parallax amount) Pf of the parallax amounts of each of the pixels which are included in the rectangular area Lf which is set in step S21 (step S22). The calculation of the parallax amount is the same as in step S15. Here, Pf is determined by the absolute value of the parallax amount. The CPU 40 confirms whether the Pf which is calculated in step S22 is the parallax amount b which is set in advance or less (step S23). That is, it is confirmed whether the parallax amount between the subject which is in focus and the furthest subject is the parallax amount b or less. The parallax amount b is set to a predetermined value within a stereoscopic perspective fusion range.

In a case where Pf is not the parallax amount b which is set in advance or less (NO in step S23), since the stereoscopic effect is excessively strong in this case, the parallax amount is reduced, whereby the aperture value of the aperture 14 is closed at the first stage via the aperture driving section 34 (step S24). As a result, it is determined whether or not the aperture 14 reaches the limit aperture value (step S25). In a case where the limit aperture value is not reached (NO in step S25), since it is possible to adjust the parallax amount, the flow returns to step S22, and the parallax amount is confirmed again.

In a case where Pf is the parallax amount b which is set in advance or less (YES in step S23) and the limit aperture value (YES in step S25), the parallax amount adjustment process is finished.

Due to this, it is possible for the parallax amount between α and β in FIG. 9, that is, the parallax amount between the nearest subject and the furthest subject to be within a predetermined range. Here, since the change amount of the parallax amount according to the aperture changes greatly as the distance is closer, the adjustment is performed by prioritizing the parallax at the near distance side in the present embodiment.

After that, when the shutter button is fully pressed, an S2ON signal is input to the CPU 40, and the CPU 40 starts the imaging and recording processes. That is, the phase difference CCD 16 is exposed at a shutter speed and an aperture value which are determined based on a photometry result.

After the image data of two parts which are output from each of the first pixels and the second pixels of the phase difference CCD 16 is taken into the VRAM 50 via an analog processing section 60, the A/D converter 20, and the image input controller 22 and converted to a luminance/color-difference signal in the image signal processing section 64, the image data is loaded into the VRAM 50. After the left eye image data which is loaded into the VRAM 50 is applied to the compression and expansion processing section 26 and compressed according to a predetermined compression format (for example, JPEG format), the left eye image data is loaded into the VRAM 50.

An MP file is generated from the compressed data of two parts which are stored in the VRAM 50, and the MP file is recorded in the memory card 54 via a media controller 2. Due to this, a stereoscopic perspective image is imaged and recorded.

Here, in the present embodiment, description was given of an example of a case of imaging a stereoscopic perspective image; however, it is possible for the single-eye stereoscopic imaging device 10 to image both two-dimensional images and stereoscopic perspective images. In a case where a two-dimensional image is imaged, it is sufficient to perform the imaging using only the first pixels of the phase difference CCD 16. Since the details of the imaging process are the same as a case of imaging a stereoscopic perspective image, description thereof will be omitted.

It is possible for the images which are recorded on the memory card 54 in the above manner to be reproduced and displayed by the liquid crystal monitor 30 by setting the mode of the single-eye stereoscopic imaging device 10 to the reproduction mode using the play button.

When set to the reproduction mode, the CPU 40 outputs a command to the media controller 52 and reads out the last image file to be recorded on the memory card 54.

After the compressed image data of the image file which is read out is applied to the compression and expansion processing section 26 and expanded by a decompression luminance/color-difference signal, the image data is output to the liquid crystal monitor 30 via the video encoder 28.

Frame-by-frame feeding of the image is performed using left and right key operations of the arrow keys, and when the right key of the arrow keys is pressed, the next image file is read out from the memory card 54 to be reproduced and displayed on the liquid crystal monitor 30. In addition, when the left key of the arrow keys is pressed, the previous image file is read out from the memory card 54 to be reproduced and displayed on the liquid crystal monitor 30.

According to the present embodiment, it is possible to appropriately set the parallax amount between the subject which is furthest from the photographer and the subject which is nearest.

Here, in the present embodiment, the parallax amount Pn of the near subject is adjusted first, and the parallax amount Pf of the far subject is adjusted second; however, the parallax amount of the far subject may be adjusted first and the parallax amount of the near subject may be adjusted second.

Second Embodiment

In the first embodiment of the present invention, the parallax amount is appropriately set between the subject which is furthest from the photographer and the subject which is nearest; however, the subject which is the target for appropriately setting the parallax amount (the subject which is the target of the parallax adjustment) is not limited thereto.

The second embodiment of the present invention is an aspect which determines the subject which is the target of the parallax adjustment by targeting only subjects which account for a predetermined range within each image of the standard image and the reference image. Below, description will be given of a single-eye stereoscopic imaging device 10-1 according to the second embodiment. Here, description will be omitted for portions which are the same as the first embodiment.

Figure 11:
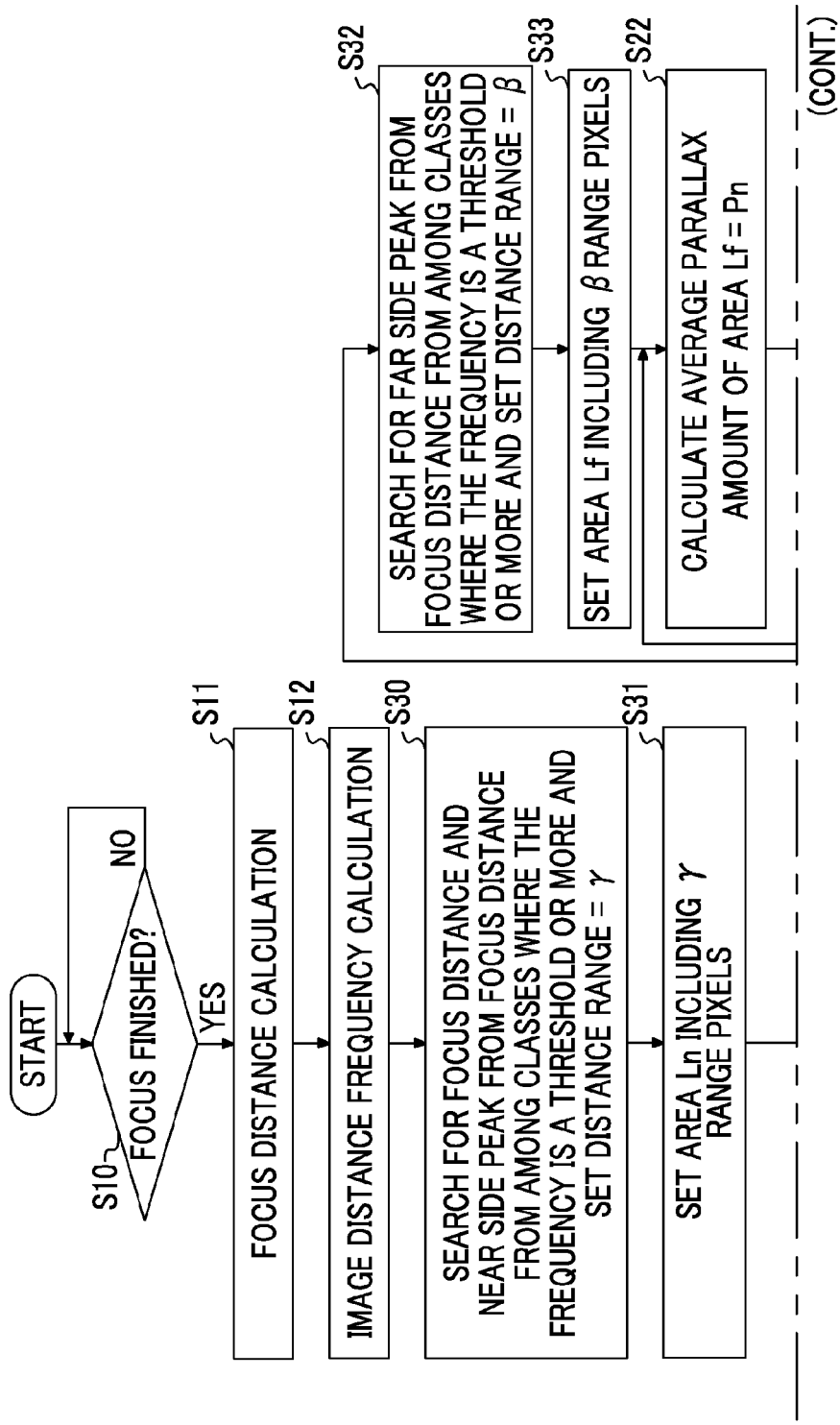
FIG. 11 is a flowchart which shows a flow of a parallax amount adjustment process in a second embodiment.

FIG. 11 is a flowchart which shows a flow of a parallax amount adjustment process which controls the F value such that the parallax amount is appropriately set between the subject which is nearest the photographer and the subject which is furthest from the photographer out of the subjects which account for a predetermined range within each image of the standard image and the reference image after the AE/AF/AWB operation. This process is primarily performed by the CPU 40.

The CPU 40 determines whether or not the AF process is finished (step S10). In a case where the AF process is not finished (NO in step S10), step S10 is performed again. In a case where the AF process is finished (YES in step S10), the subject distance of the subject which is in focus is determined (step S11).

The CPU 40 creates a histogram with a distance frequency which is the distribution of the distance information (step S12). The CPU 40, which also functions as control unit which controls the parallax amount of the image regions which are the target of parallax adjustment using the aperture value based on the distribution of the distance information, searches for the focus distance and the class with the highest frequency which is a peak at the near side thereof (in the direction which approaches the camera) from among the classes where the frequency of the histogram is a threshold or more (step S30). When the histogram which is created in step S12 is set as FIG. 12, the subject (person A) which is in focus is the threshold or more; however, there is no class which is the histogram threshold or more at the side nearer than the focus distance. Accordingly, the CPU 40 sets the class γ of the person A as the search result. A class where the frequency of the histogram is the threshold or more has the meaning of accounting for a predetermined range within each of the images of the standard image and the reference image. Accordingly, by limiting the frequency of the histogram to a class which is the threshold or more, it is possible to exclude subjects with a narrow range which are imaged from the subjects which are the target of the parallax adjustment. In the example shown in FIG. 12, the area of the flowers B is determined to have a narrow reflected range, and is excluded from the subjects which are targets of parallax adjustment. Here, a value which is set in advance may be used as the threshold, the photographer may change the threshold via the operation section 38, or the CPU 40 may automatically set the threshold such that, for example, three classes exceed the threshold.

The CPU 40 selects pixels which have a subject distance which is within the range which is searched in step S30 from the standard image data and the reference image data, and sets a rectangular area Ln which includes these pixels (step S31). The CPU 40 calculates the average value (average parallax amount) Pn of the parallax amounts of each of the pixels which are included in the rectangular area Ln which is set in step S14 (step S15).

The CPU 40 confirms whether or not Pn which is calculates in step S15 is within a range of the parallax amount a to a−t1 which are set in advance (step S16). The parallax amount a is set to a predetermined value within a stereoscopic perspective fusion range.

In a case where Pn is not within the range of the parallax amounts a and a−t1 which are set in advance (NO in step S16) and where Pn is smaller than the parallax amount a−t1, since the parallax amount is excessively small and an appropriate stereoscopic effect is not obtained in this case, the CPU 40 opens the aperture 14 at a first stage via the aperture driving section 34 and increases the parallax amount (step S17). In addition, in a case where Pn is not within the range of the parallax amounts a and a−t1 which are set in advance (NO in step S16) and where Pn is larger than the parallax amount a, since the stereoscopic effect is excessively strong in this case, the CPU 40 closes the aperture 14 at a first stage via the aperture driving section 34 and reduces the parallax amount (step S18).

As a result, it is determined whether or not the aperture 14 reaches the limit aperture value (step S19). In a case where the limit aperture value is not reached (NO in step S19), since it is possible to adjust the parallax amount, the flow returns to step S15, and the parallax amount is confirmed again.

In a case where Pn is within the range of the parallax amounts a and a−t1 which are set in advance (YES in step S16) and where Pn is the limit aperture value (YES in step S19), the CPU 40 searches for the focus distance and the class with the highest frequency which is the peak at a side which is further (in the direction which moves away from the camera) than the focus distance from among those where the frequency of the histogram is the threshold or more (step S32). In the case shown in FIG. 12, this is β.

The CPU 40 selects pixels which have a subject distance which is within the range which is searched in step S31 from the standard image data and the reference image data, and sets a rectangular area Lf which includes these pixels (step S33).

The CPU 40 calculates an average value (an average parallax amount) Pf of the parallax amounts of each of the pixels which are included in the rectangular area Lf which is set in step S21 (step S22). The calculation of the parallax amount is the same as in step S15. The CPU 40 confirms whether the Pf which is calculated in step S22 is the parallax amount b which is set in advance or less (step S23). The parallax amount b is set to a predetermined value within a stereoscopic perspective fusion range.

In a case where Pf is not the parallax amount b which is set in advance or less (NO in step S23), since the stereoscopic effect is excessively strong in this case, the parallax amount is reduced, whereby the aperture value of the aperture 14 is closed at the first stage via the aperture driving section 34 (step S24). As a result, it is determined whether or not the aperture 14 reaches the limit aperture value (step S25). In a case where the limit aperture value is not reached (NO in step S25), since it is possible to adjust the parallax amount, the flow returns to step S22, and the parallax amount is confirmed again.

In a case where Pf is the parallax amount b which is set in advance or less (YES in step S23) and the limit aperture value (YES in step S25), the parallax amount adjustment process is finished. Due to this, it is possible for the parallax amount between γ and β in FIG. 12 to be within a predetermined range.

According to the present embodiment, by excluding the subjects with a narrow range which are imaged from the subjects which are the targets of the parallax adjustment, the subject which is the target of the parallax adjustment is set from among the subjects with a constant ratio or more in the images which are imaged, and it is possible to set the parallax amount between these subjects to an appropriate parallax amount. Accordingly, it is possible to image a parallax image with a more appropriate stereoscopic effect.

Here, in the present embodiment, the threshold is not changed during the process; however, the threshold may be adjusted in cases or the like where it is hard to see the target of the parallax adjustment when the threshold is excessively high. The adjustment of the threshold may be performed automatically by the CPU 40, or may be performed upon instruction from the photographer.

Figure 12:
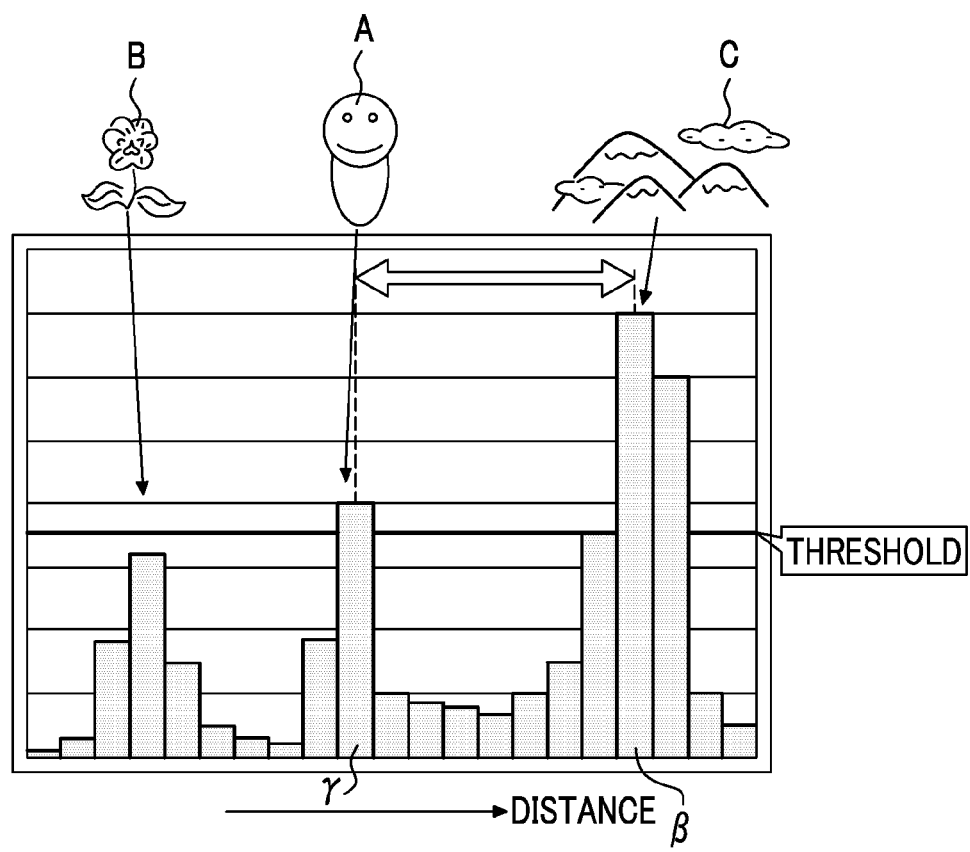
FIG. 12 is a histogram which shows a distribution of distance information in the second embodiment.

In addition, in the present embodiment, in steps S30 and S32, the subject which is the target of parallax adjustment is set by searching for the focus distance and the class with the highest frequency which is the peak at the near side or the far side thereof from among the classes where the frequency of the histogram is the threshold or more; however, the subject which is the target of the parallax adjustment is not limited thereto. For example, the subject which is the parallax target may be set by searching for the class of the nearest side or the furthest side from among the classes where the frequency of the histogram is the threshold or more. In FIG. 12, the class which is one to the right of the class β is the subject which is the parallax target.

Third Embodiment

In the first embodiment of the present invention, the parallax amount is appropriately set between the subject which is furthest from the photographer and the subject which is nearest; however, the subject which is the target for appropriately setting the parallax amount (the subject which is the target of the parallax adjustment) is not limited thereto.

Below, description will be given of a single-eye stereoscopic imaging device 10-2 according to the third embodiment. Here, description will be omitted for portions which are the same as the first embodiment.

Figure 13:
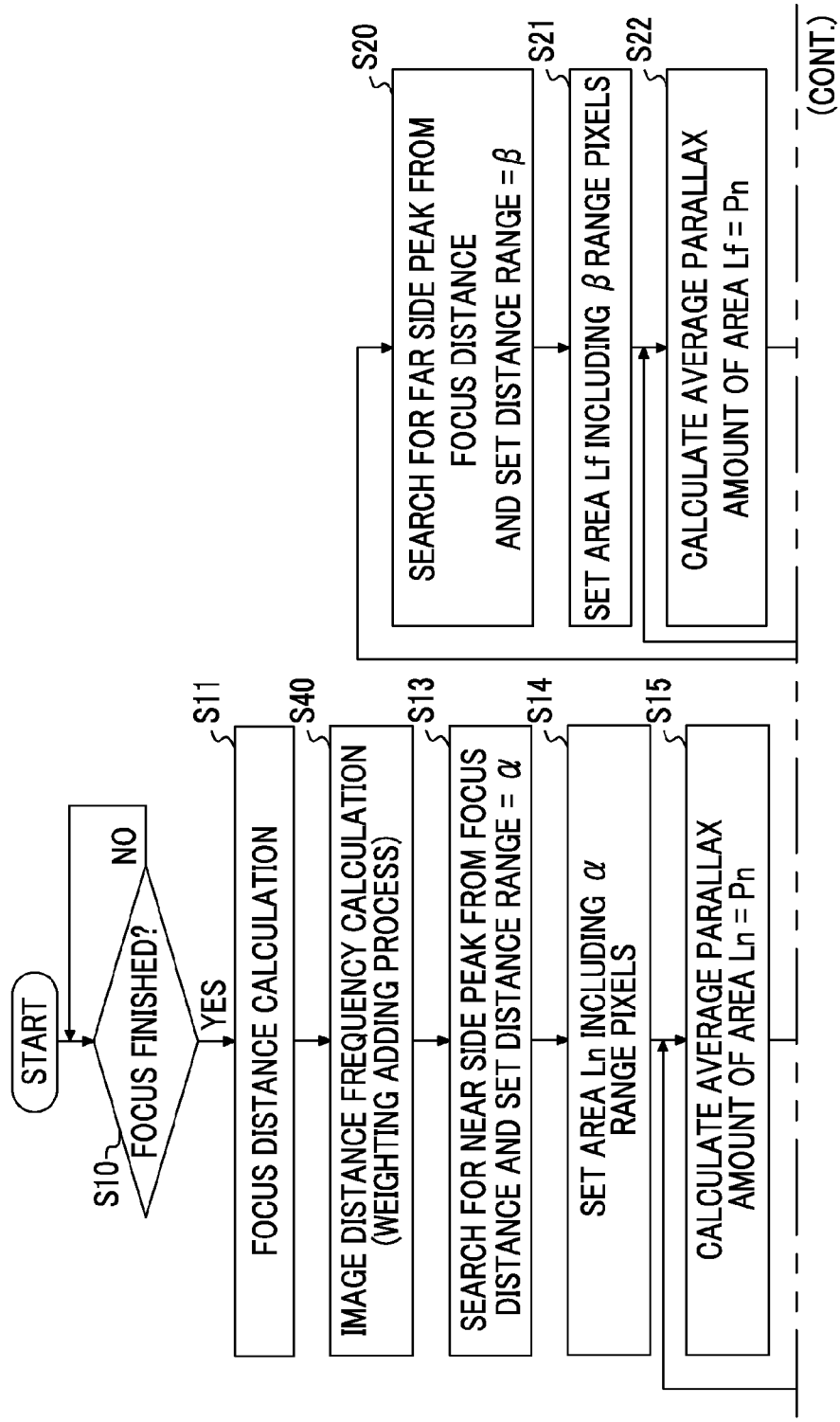
FIG. 13 is a flowchart which shows a flow of a parallax amount adjustment process in a third embodiment.

FIG. 13 is a flowchart which shows a flow of a parallax amount adjustment process which controls the F value such that the parallax amount between the subjects which are the target of the parallax adjustment is appropriately set after the AE/AF/AWB operation. This process is primarily performed by the CPU 40.

The CPU 40 determines whether or not the AF process is finished (step S10). In a case where the AF process is not finished (NO in step S10), step S10 is performed again. In a case where the AF process is finished (YES in step S10), the subject distance of the subject which is in focus is determined (step S11).

The CPU 40 applies a weighting according to the position of the pixels and creates a histogram of the distance frequency (step S40). Below, description will be given of the process of step S40.

Figure 14:
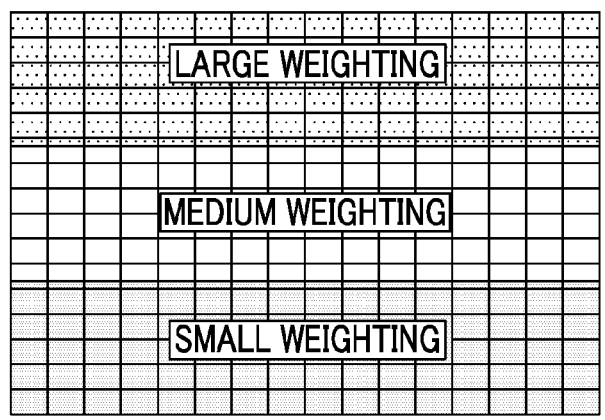
FIG. 14 is an example of adding weighting.

First, the CPU 40 calculates the subject distance for each of the pixels of the standard image data in a similar manner to step S12. Next, in a similar manner to step S12, the CPU 40 divides the standard image data into a plurality of regions as shown in FIG. 8 and calculates the total value of the subject distances which are calculated for each of the pixels for each of the regions. Finally, the CPU 40 creates the data on which the histogram is based by adding a weighting according to the position of each of the regions. In the present embodiment, as shown in FIG. 14, the weighting is increased at the upper side of the image and the weighting decreases toward the lower side. For example, usually, the frequency is one; however, in a case where the weighting is increased, for example, doubled, the frequency is two, and in a case where the weighting is reduced, for example, halved, a process which sets the frequency to 0.5 is performed. Since the parallax amount is easily increased at the side where the subject distance is nearer than the focus distance, when there is a subject where the subject distance is close, there is control which reduces the parallax amount quickly. Accordingly, by increasing the weighting of the upper side of an image where it is thought that there are many subjects at a far distance, data where a weighting is added to the subjects at a far distance is generated.

Figure 15:
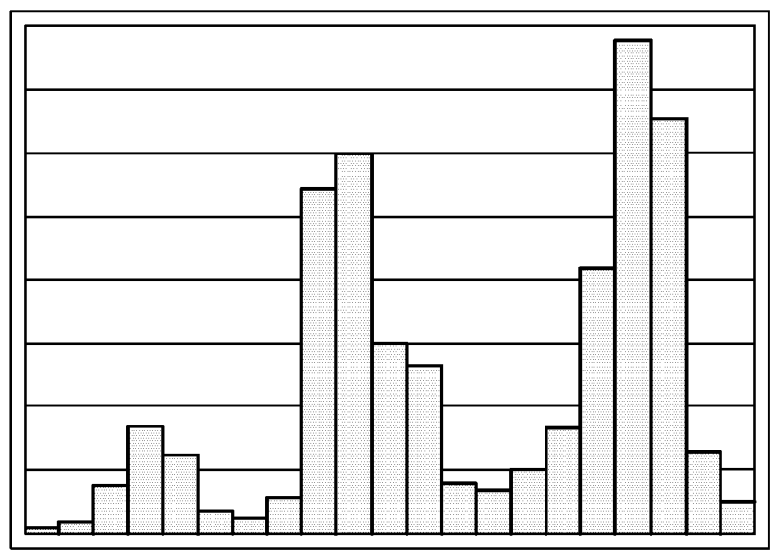
FIG. 15 is a histogram which shows a distribution of distance information in the third embodiment.

The CPU 40 creates a histogram by using the weighted data. FIG. 15 shows the created histogram. The horizontal axis is the subject distance and the vertical axis is the frequency of the regions where the total values of the subject distance are included in each of the subject distance ranges. In comparison with FIG. 9 which is a histogram which is created without weighting with regard to the same subject, it is understood that the frequency of classes which are equivalent to the person A and the background C is increased.

The CPU 40 searches for the class with the highest frequency which is the peak at the side which is nearer (in the direction which approaches the camera) than the focus distance (the subject distance of the subject which is in focus) based on the histogram (step S13). The CPU 40 selects pixels which have a subject distance within a range which is searched in step S13 from the standard image data and the reference image data, and sets a rectangular area Ln which includes these pixels (step S14). The CPU 40 calculates the average value (average parallax amount) Pn of the parallax amounts of each of the pixels which are included in the rectangular area Ln which is set in step S14 (step S15).

The CPU 40 confirms whether or not Pn which is calculated in step S15 is within a range of the parallax amount a to a−t1 which are set in advance (step S16). The parallax amount a is set to a predetermined value within a stereoscopic perspective fusion range.

In a case where Pn is not within the range of the parallax amounts a and a−t1 which are set in advance (NO in step S16) and where Pn is smaller than the parallax amount a−t1, since the parallax amount is excessively small and an appropriate stereoscopic effect is not obtained in this case, the CPU 40 opens the aperture 14 at a first stage via the aperture driving section 34 and increases the parallax amount (step S17). In addition, in a case where Pn is not within the range of the parallax amounts a and a−t1 which are set in advance (NO in step S16) and where Pn is larger than the parallax amount a, since the stereoscopic effect is excessively strong in this case, the CPU 40 closes the aperture 14 at a first stage via the aperture driving section 34 and reduces the parallax amount (step S18).

As a result, it is determined whether or not the aperture 14 reaches the limit aperture value (step S19). In a case where the limit aperture value is not reached (NO in step S19), since it is possible to adjust the parallax amount, the flow returns to step S15, and the parallax amount is confirmed again.

In a case where Pn is within the range of the parallax amounts a and a−t1 which are set in advance (YES in step S16) and where Pn is the limit aperture value (YES in step S19), the CPU 40 searches for the class with the highest frequency which is the peak at a side which is further (in the direction which moves away from the camera) than the focus distance based on the histogram (step S20). The CPU 40 selects the pixels which have a subject distance within the range which is searched in step S20 from the standard image data and the reference image data, and sets a rectangular area Lf which includes these pixels (step S21).

The CPU 40 calculates an average value (an average parallax amount) Pf of the parallax amounts of each of the pixels which are included in the rectangular area Lf which is set in step S21 (step S22). The calculation of the parallax amount is the same as in step S15 The CPU 40 confirms whether the Pf which is calculated in step S22 is the parallax amount b which is set in advance or less (step S23). The parallax amount b is set to a predetermined value within a stereoscopic perspective fusion range.

In a case where Pf is not the parallax amount b which is set in advance or less (NO in step S23), since the stereoscopic effect is excessively strong in this case, the parallax amount is reduced, whereby the aperture value of the aperture 14 is closed at the first stage via the aperture driving section 34 (step S24). As a result, it is determined whether or not the aperture 14 reaches the limit aperture value (step S25). In a case where the limit aperture value is not reached (NO in step S25), since it is possible to adjust the parallax amount, the flow returns to step S22, and the parallax amount is confirmed again.

In a case where Pf is the parallax amount b which is set in advance or less (YES in step S23) and the limit aperture value (YES in step S25), the parallax amount adjustment process is finished. Due to this, it is possible for the parallax amount between γ and β in FIG. 12 to be within a predetermined range.

According to the present embodiment, by creating a distribution of distance information by weighting according to the positions of the pixels, it is possible to image parallax images with a stereoscopic effect which better matches the intention of the photographer.

In addition, in the present embodiment, by increasing the weighting of the upper side of an image where it is thought that there are many subjects at a far distance, a histogram is created by generating data which is weighted for the subjects at a far distance; however, the weighting method is not limited thereto, and it is possible for the photographer to arbitrarily set the method via the operation section 38 or the like. For example, the weighting may be increased at the center of an image where it is thought that an important subject is imaged.

In addition, in the present embodiment, the histogram is created by adding a weighting according to the position, and the aperture value is controlled such that the parallax amount between the nearest subject and the furthest subject is appropriately set; however, the aperture value may be controlled by setting the subject which is the target of parallax adjustment by limiting to classes where the frequency is the threshold or more with regard to the histogram where a weighting is added according to position.

Fourth Embodiment

In the first embodiment of the present invention, the parallax amount is appropriately set between the subject which is furthest from the photographer and the subject which is nearest; however, the subject which is the target for appropriately setting the parallax amount (the subject which is the target of the parallax adjustment) is not limited thereto.

The fourth embodiment of the present invention is an aspect which refers to the subject which is in focus and which optimally controls the parallax amount based on two sets of information on the parallax amount up to the subject which is furthest from the photographer and the parallax amount up to the subject which is closest to the photographer. Below, description will be given of a single-eye stereoscopic imaging device 10-3 according to the fourth embodiment. Here, description will be omitted for portions which are the same as the first embodiment.

Figure 16:
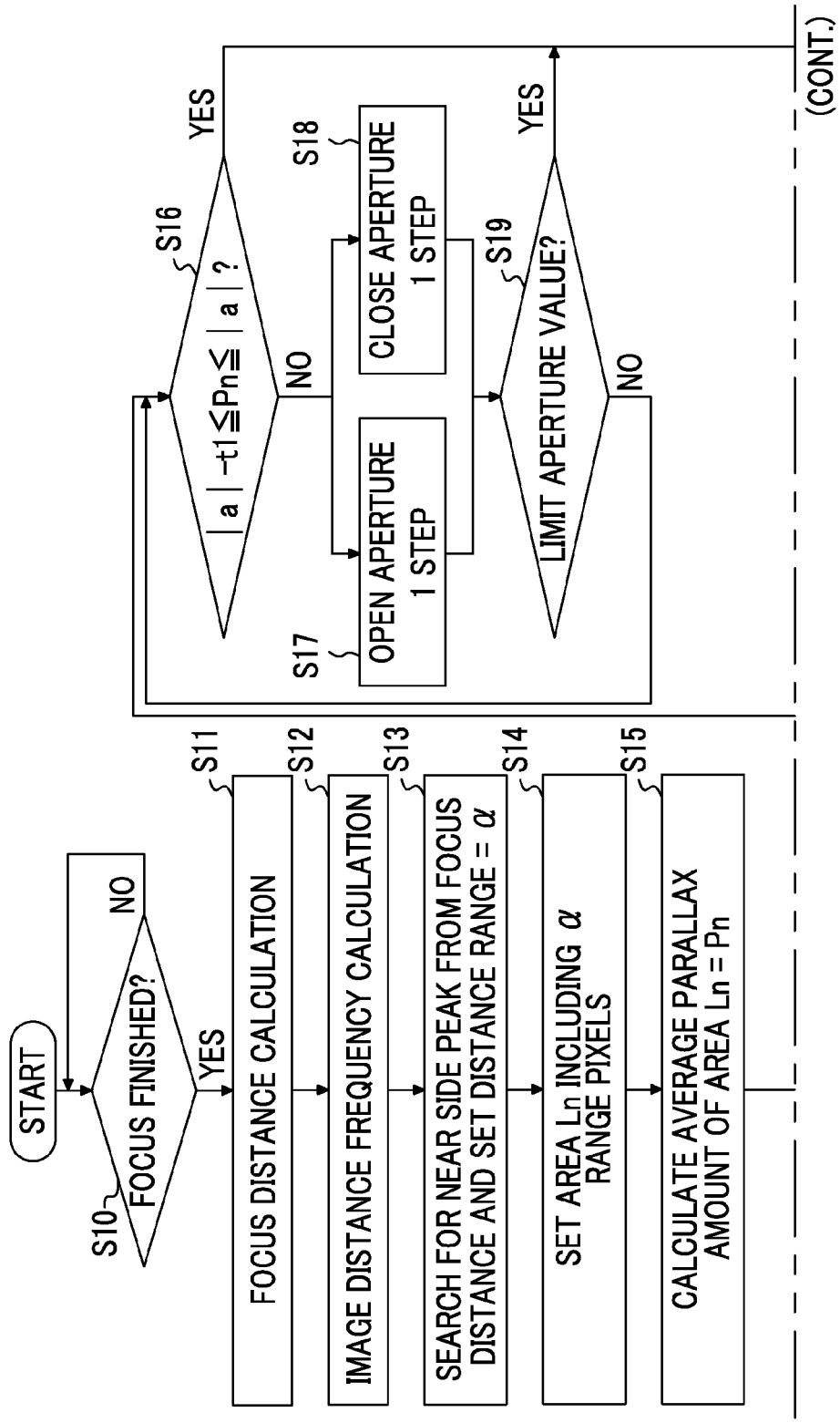
FIG. 16 is a flowchart which shows a flow of a parallax amount adjustment process in a fourth embodiment.

FIG. 16 is a flowchart which shows a flow of a parallax amount adjustment process which controls the F value such that the parallax amount between the subjects which are the target of the parallax adjustment is appropriately set after the AE/AF/AWB operation. This process is primarily performed by the CPU 40.

The CPU 40 determines whether or not the AF process is finished (step S10). In a case where the AF process is not finished (NO in step S10), step S10 is performed again. In a case where the AF process is finished (YES in step S10), the subject distance of the subject which is in focus is determined (step S11).

The CPU 40 creates a histogram with a distance frequency (step S12). The CPU 40 searches for the class with the highest frequency which is the peak at the side which is nearer (in the direction which approaches the camera) than the focus distance (the subject distance of the subject which is in focus) based on the histogram (step S13). The CPU 40 selects pixels which have a subject distance within a range which is searched in step S13 from the standard image data and the reference image data, and sets a rectangular area Ln which includes these pixels (step S14). The CPU 40 calculates the average value (average parallax amount) Pn of the parallax amounts of each of the pixels which are included in the rectangular area Ln which is set in step S14 (step S15).

In addition, the CPU 40 searches for the class with the highest frequency which is the peak at a side which is further (in the direction which moves away from the camera) than the focus distance based on the histogram (step S20). The CPU 40 selects the pixels which have a subject distance within the range which is searched in step S20 from the standard image data and the reference image data, and sets a rectangular area Lf which includes these pixels (step S21). The CPU 40 calculates an average value (an average parallax amount) Pf of the parallax amounts of each of the pixels which are included in the rectangular area Lf which is set in step S21 (step S22).

The CPU 40 compares Pn and Pf and determines which is largest (step S50). In the example shown in FIG. 17, the parallax amount Pn between the person B and the flowers A which are the subjects which are in focus is larger than the parallax amount Pf between the person B and the background C. In a case where it is determined that Pn and Pf are the same or that Pn is larger in step S50, the CPU 40 confirms whether or not the Pn which is calculated in step S15 is within a range of parallax amounts a to a–t1 which are set in advance (step S16).

In a case where Pn is not within the range of the parallax amounts a and a–t1 which are set in advance (NO in step S16) and where Pn is smaller than the parallax amount a–t1, since the parallax amount is excessively small and an appropriate stereoscopic effect is not obtained in this case, the CPU 40 opens the aperture 14 at a first stage via the aperture driving section 34 and increases the parallax amount (step S17). In addition, in a case where Pn is not within the range of the parallax amounts a and a–t1 which are set in advance (NO in step S16) and where Pn is larger than the parallax amount a, since the stereoscopic effect is excessively strong in this case, the CPU 40 closes the aperture 14 at a first stage via the aperture driving section 34 and reduces the parallax amount (step S18).

As a result, it is determined whether or not the aperture 14 reaches the limit aperture value (step S19). In a case where the limit aperture value is not reached (NO in step S19), since it is possible to adjust the parallax amount, the flow returns to step S16, and the parallax amount is confirmed again.

In a case where it is determined that Pn is larger in step S50, the CPU 40 confirms whether the Pf which is calculated in step S22 is the parallax amount b which is set in advance or less (step S23). The parallax amount b is set to a predetermined value within a stereoscopic perspective fusion range.

In a case where Pf is not the parallax amount b which is set in advance or less (NO in step S23), since the stereoscopic effect is excessively strong in this case, the parallax amount is reduced, whereby the aperture value of the aperture 14 is closed at the first stage via the aperture driving section 34 (step S24). As a result, it is determined whether or not the aperture 14 reaches the limit aperture value (step S25). In a case where the limit aperture value is not reached (NO in step S25), since it is possible to adjust the parallax amount, the flow returns to step S23, and the parallax amount is confirmed again.

In a case where Pn is within the range of the parallax amounts a and a–t1 which are set in advance (YES in step S16) and a case where Pn is the parallax amount b or less which is set in advance (YES in step S23) and the limit aperture value (YES in step S19 and S25), the parallax amount adjustment process is finished.

According to the present embodiment, it is possible to refer to the subject which is in focus and to appropriately control the parallax amount between the subject which is in focus and the nearest subject, that is, the parallax amount in the jumping out direction, or the parallax amount between the subject which is in focus and the furthest subject, that is, the parallax amount in the depth direction.

Here, in the present embodiment, since the near distance side is prioritized, the adjustment of the parallax amount is performed using Pn in a case where Pn and Pf are the same; however, the adjustment of the parallax amount may be performed using Pf in a case where Pn and Pf are the same.

Figure 17:
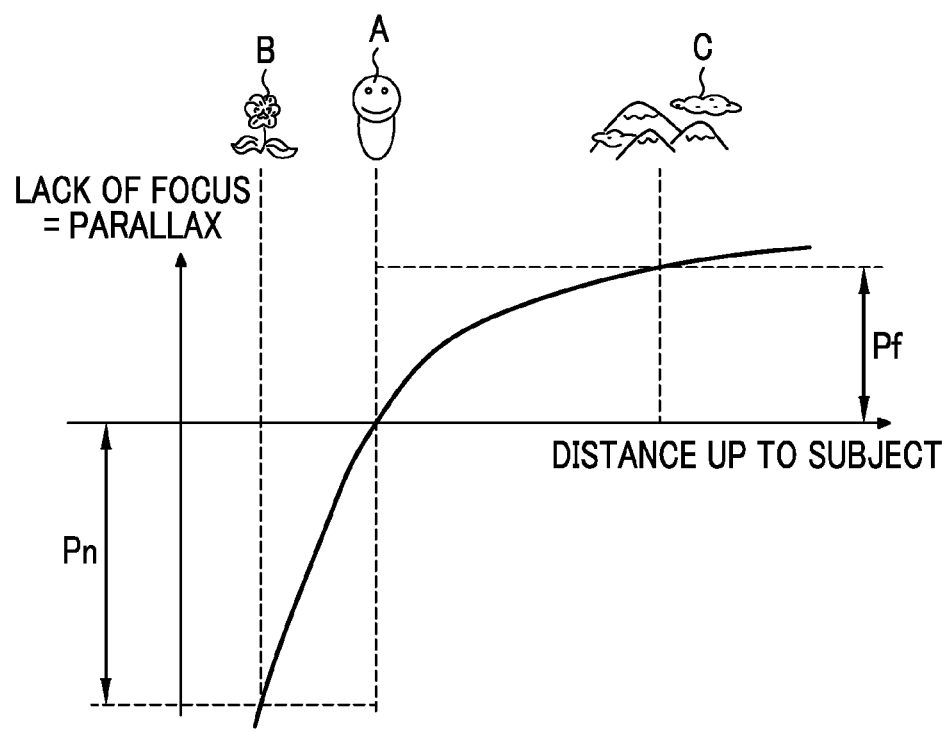
FIG. 17 is a diagram which shows a relationship between a subject distance and a parallax amount.

In addition, in the present embodiment, Pn and Pf are compared and the adjustment of the parallax amount is performed with reference to the larger; however, the photographer may set the reference. In the example which is shown in FIG. 17, in a case where subjects on the far side are set to be prioritized by the photographer via the operation section 38, the CPU 40 controls the aperture value of the aperture 14 so as to appropriately set the parallax amount between the person B and the background C. In such a case, even when the parallax amount between person A and the flowers B is larger than the parallax amount a as a result of performing the control of the aperture value, the CPU 40 controls the aperture value such that the parallax amount between the background C which is a far subject and the person B is appropriately set. Due to this, it is possible to image a parallax image with a stereoscopic effect as desired by the photographer.

Fifth Embodiment

The fourth embodiment of the present invention is an aspect which refers to the subject which is in focus and optimally controls either of a parallax amount up to a subject which is far from the photographer and a parallax amount up to a subject which is near the photographer; however, both may be optimally controlled.

The fifth embodiment of the present invention is an aspect which optimizes both of the parallax amount up to a subject which is far from the subject which is under focus and a parallax amount up to a subject which is near the subject which is under focus. Below, description will be given of a single-eye stereoscopic imaging device 10-4 according to the fifth embodiment. Here, description will be omitted for portions which are the same as the first embodiment.

Figure 18:
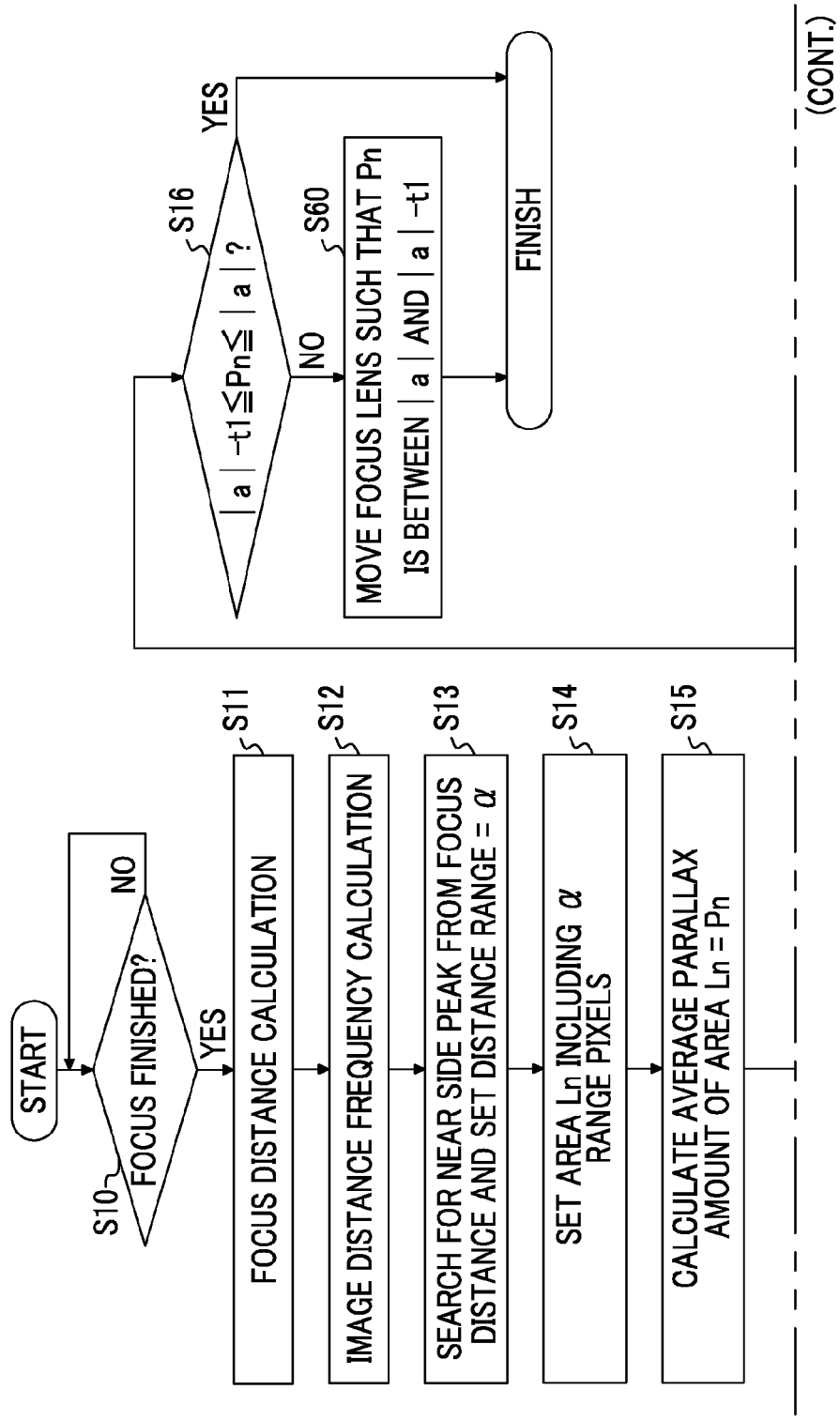
FIG. 18 is a flowchart which shows a flow of a parallax amount adjustment process in a fifth embodiment.

FIG. 18 is a flowchart which shows a flow of a parallax amount adjustment process which controls the F value such that the parallax amount between the subjects which are the targets of parallax adjustment is appropriate after the AE/AF/AWB operation. This process is primarily performed by the CPU 40.

The CPU 40 determines whether or not the AF process is finished (step S10). In a case where the AF process is not finished (NO in step S10), step S10 is performed again. In a case where the AF process is finished (YES in step S10), the subject distance of the subject which is in focus is determined (step S11).

The CPU 40 creates a histogram with a distance frequency (step S12). The CPU 40 searches for the class with the highest frequency which is the peak at the side which is nearer (in the direction which approaches the camera) than the focus distance (the subject distance of the subject which is in focus) based on the histogram (step S13). The CPU 40 selects pixels which have a subject distance within a range which is searched in step S13 from the right image data and the left image data (the standard image is the right image and the reference image is the left image), and sets a rectangular area Ln which includes these pixels (step S14). The CPU 40 calculates the average value (average parallax amount) Pn of the parallax amounts of each of the pixels which are included in the rectangular area Ln which is set in step S14 (step S15).

In addition, the CPU 40 searches for the class with the highest frequency which is the peak at a side which is further (in the direction which moves away from the camera) than the focus distance based on the histogram (step S20). The CPU 40 selects the pixels which have a subject distance within the range which is searched in step S20 from the standard image data and the reference image data, and sets a rectangular area Lf which includes these pixels (step S21). The CPU 40 calculates an average value (an average parallax amount) Pf of the parallax amounts of each of the pixels which are included in the rectangular area Lf which is set in step S21 (step S22).

The CPU 40 confirms whether the Pf which is calculated in step S22 is the parallax amount b which is set in advance or less (step S23). The parallax amount b is set to a predetermined value within a stereoscopic perspective fusion range.

In a case where Pf is not the parallax amount b which is set in advance or less (NO in step S23), since the stereoscopic effect is excessively strong in this case, the parallax amount is reduced, whereby the aperture value of the aperture 14 is closed at the first stage via the aperture driving section 34 (step S24). As a result, it is determined whether or not the aperture 14 reaches the limit aperture value (step S25). In a case where the limit aperture value is not reached (NO in step S25), since it is possible to adjust the parallax amount, the flow returns to step S23, and the parallax amount is confirmed again. Due to this, the parallax amount between the subject which is at the focus position and the far subject is adjusted to be appropriate.

In a case where it is determined that Pn is the parallax amount b which is set in advance or less (YES in step S23) and the limit aperture value (YES in step S25), the CPU 40 confirms whether or not the Pn which is calculated in step S15 is within a range of parallax amounts a to at1 which are set in advance (step S16).

Figure 19:
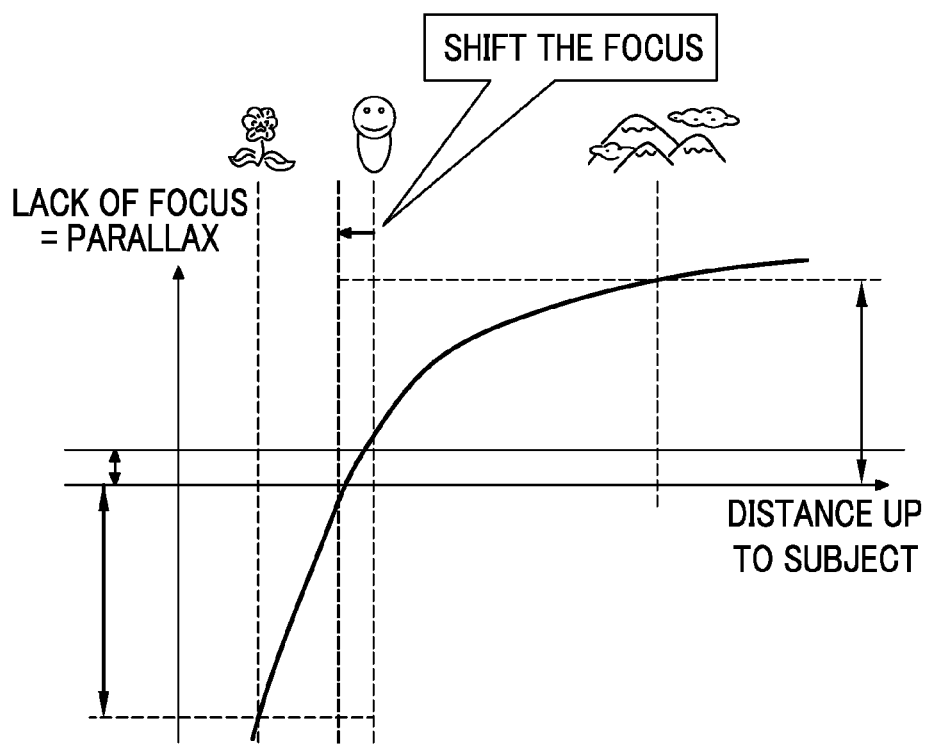
FIG. 19 is a diagram which shows a relationship between the subject distance and the parallax amount when a focus position is changed.

In a case where Pn is not within a range of the parallax amounts a to a–t1 which are set in advance (NO in step S16), the CPU 40 moves the focus lens via the lens driving section 36 such that Pn fits within the range of the parallax amounts a to a–t1 which are set in advance (step S60). For example, in a case where the parallax amount Pn is larger than the parallax amount a in FIG. 17, the CPU 40 moves the focus lens such that the parallax amount Pn is in the range of the parallax amounts a to a–t1. As a result, as shown in FIG. 19, the parallax amount Pn becomes a parallax amount Pn' which is within a range of the parallax amount a to a–t1, the person A which is the subject at the focus position has a parallax amount X in the depth direction by being moved to the far side from the focus distance, and the parallax amount Pf becomes a parallax amount Pf' which is smaller than Pf.

In a case where Pn is within the range of the parallax amounts a to a–t1 which are set in advance (YES in step S16), the parallax amount adjustment process is finished.

According to the present embodiment, by controlling the focus position in addition to the control of the aperture value, it is possible to perform more precise adjustment of the parallax amount in a case where one or the other of the parallax amount between the subject which is in focus and the near subject and the parallax amount between the subject which is in focus and the far subject is excessively large or excessively small.

Here, in the present embodiment, firstly, the parallax amount of the subject at the far side is adjusted by control of the aperture and the parallax amount of the subject at the near side is adjusted by control of the focus position; however, the parallax amount of the subject at the near side may be adjusted by control of the aperture and the parallax amount of the subject at the far side may be adjusted by control of the focus position.

In addition, in the flow which is shown in FIG. 6 of the first embodiment, in a case where adjustment of the parallax amount by the aperture value is not possible due to the limit aperture value (NO in step S19 and S25), the adjustment of the parallax amount may be performed by controlling the focus position. For example, in a case where FIG. 6 is the limit aperture value in step S19 (YES in step S19), it is sufficient if the CPU 40 returns to step S15 in FIG. 6 again by moving the focus lens (step S60 in FIG. 19) via the lens driving section 36 such that Pn fits within the range of the parallax amounts a and a–t1 which are set in advance.

Here, in the present embodiment, description was given of an example using a CCD as the imaging element; however, the present invention is not limited to a CCD. The present invention is also applicable to other image sensors such as CMOS. In addition, it should be noted that it is possible for the program described above to cause a calculating device to execute acquiring a plurality of images by receiving light beams which each pass through different regions in a single imaging optical system, determining the distribution of distance information on subjects which are included in the plurality of images based on the plurality of images, and controlling a parallax amount of an image region, which is a target of parallax adjustment, using the aperture value, based on the distribution of the distance information.

Above, description was given of the present invention using embodiments; however, the technical scope of the present invention is not limited to the range which is described in the embodiments described above. It would be clear to a person skilled in the art that it is possible to add various modifications or improvements to the embodiments described above. It is clear from the description in the scope of the claims that aspects where such modifications or improvements are added may be included in the technical range of the present invention.

For example, instead of the phase difference imaging elements in the left and right direction as shown in FIG. 2, it is also possible to use phase difference imaging elements in the left and right direction and the up and down direction. In such a case, by including a total of four pixels of two in the left and right direction and two in the up and down direction in one pixel, it is possible to obtain four image signals at one time. Even in a case where four image signals are obtained, it is possible to obtain the same results by selecting the top left image as the standard image, selecting a desired image from among the remaining three images as the reference image, and performing processing a plurality of times with respect to the two images which are selected. That is, although two images are set as a target in the scope of the claims, the present invention is not limited to a case of acquiring two images, and it is possible to apply the present invention to all cases of acquiring a plurality of two or more images.

It should be noted that the order of executing each of the processes in the operation, the procedures, the steps, the stages, and the like in the apparatus, the system, the program, and the method which are shown in the scope of the claims, the specification, and in the drawings may be implemented in an arbitrary order as long as there is no particular indication of "prior to", "before", or the like and the output of a preceding process is not used in a subsequent process. Even when description was given relating to the operation flow in the scope of the claims, the specification, and the drawings using "Firstly," "Next," or the like for convenience, this does not mean that the execution is necessarily in this order.

What is claimed is:

1. A single-eye stereoscopic imaging device comprising:
a single imaging optical system which includes a focus lens;
an imaging element which acquires a plurality of images by receiving light beams which each pass through different regions of the imaging optical system;
an aperture where it is possible to change an aperture value;
distance information acquiring unit which determines a distribution of distance information on subjects which are included in the plurality of images based on the plurality of images,
wherein the distance information acquiring unit divides the standard image which is one image out of a plurality of images into a plurality of regions, calculates the distance information for each of the plurality of divided regions, divides the distance information into a plurality of classes for each distance range, and creates a histogram where the number of regions, where the distance information which is calculated falls in the ranges of each of the classes, is the frequency; and
control unit which controls the aperture value and movement of the focus lens such that a parallax amount of an image region, which is a target of parallax adjustment, is a parallax amount within a predetermined range based on the distribution of the distance information.

2. The single-eye stereoscopic imaging device according to claim 1, wherein the distance information acquiring unit calculates distance information for each pixel of a standard image which is one image out of a plurality of images, divides the distance information into a plurality of classes for each distance range, and creates a histogram where the number of pixels, where the distance information which is calculated falls in the ranges of each of the classes, is the frequency.

3. The single-eye stereoscopic imaging device according to claim 2, wherein the distance information acquiring unit calculates the distance information by performing a pattern matching process between the standard image and an image other than the standard image out of the plurality of images.

4. The single-eye stereoscopic imaging device according to claim 2, wherein the control unit controls the aperture value by setting at least one, in the histogram, of between a subject distance of the subject which is in focus and a subject distance which has a peak in the histogram on the near side, and between a subject distance of the subject which is in focus and a subject distance which has a peak in the histogram on the far side as the image region which is the target of the parallax adjustment.

5. The single-eye stereoscopic imaging device according to claim 4, wherein the control unit controls the aperture value and sets the parallax amount between the subject which is in focus and the image region which is the target of the parallax adjustment to within a range of constant values.

6. The single-eye stereoscopic imaging device according to claim 2, wherein the control unit determines an image region which is the target of the parallax adjustment by targeting regions, which are included in a class where the frequency of the histogram is a threshold or more, out of the plurality of regions which are divided.

7. The single-eye stereoscopic imaging device according to claim 6, wherein the control unit controls the aperture value and sets the parallax amount between the subject which is in focus and the image region which is the target of the parallax adjustment to within a range of constant values.

8. The single-eye stereoscopic imaging device according to claim 2, wherein the distance information acquiring unit calculates the distance information by adding weightings which differ according to the position inside any image of the plurality of images.

9. The single-eye stereoscopic imaging device according to claim 1, wherein the distance information acquiring unit calculates the distance information for each pixel of the standard image and calculates the distance information for each of the plurality of regions by calculating the average value of the distance information of pixels, which are included in each of the regions which are divided, for each of the regions.

10. The single-eye stereoscopic imaging device according to claim 9, wherein the control unit controls the aperture value by setting at least one, in the histogram, of between a subject distance of the subject which is in focus and a subject distance which has a peak in the histogram on the near side, and between a subject distance of the subject which is in focus and a subject distance which has a peak in the histogram on the far side as the image region which is the target of the parallax adjustment.

11. The single-eye stereoscopic imaging device according to claim 10, wherein the control unit controls the aperture value and sets the parallax amount between the subject which is in focus and the image region which is the target of the parallax adjustment to within a range of constant values.

12. The single-eye stereoscopic imaging device according to claim 9, wherein the control unit determines an image region which is the target of the parallax adjustment by targeting regions, which are included in a class where the frequency of the histogram is a threshold or more, out of the plurality of regions which are divided.

13. The single-eye stereoscopic imaging device according to claim 1, wherein the distance information acquiring unit calculates the distance information by performing a pattern matching process between the standard image and an image other than the standard image out of the plurality of images.

14. The single-eye stereoscopic imaging device according to claim 1, wherein the control unit controls the aperture value by setting at least one, in the histogram, of between a subject distance of the subject which is in focus and a subject distance which has a peak in the histogram on the near side, and between a subject distance of the subject which is in focus and a subject distance which has a peak in the histogram on the far side as the image region which is the target of the parallax adjustment.

15. The single-eye stereoscopic imaging device according to claim 14, wherein the control unit controls the aperture value and sets the parallax amount between the subject which is in focus and the image region which is the target of the parallax adjustment to within a range of constant values.

16. The single-eye stereoscopic imaging device according to claim 1, wherein the control unit determines an image region which is the target of the parallax adjustment by targeting regions, which are included in a class where the frequency of the histogram is a threshold or more, out of the plurality of regions which are divided.

17. The single-eye stereoscopic imaging device according to claim 1, wherein the distance information acquiring unit calculates the distance information by adding weightings which differ according to the position inside any image of the plurality of images.

18. A single-eye stereoscopic imaging method for the single-eye stereoscopic imaging device according to claim 1 comprising:
   acquiring a plurality of images by receiving light beams which each pass through different regions in a single imaging optical system which includes a focus lens;
   determining the distribution of distance information on subjects which are included in the plurality of images based on the plurality of images,
   wherein the distance information in a standard image which is one image out of a plurality of images is divided into a plurality of regions, the distance information for each of the plurality of divided regions is calculated, the distance information is divided into a plurality of classes for each distance range, and a histogram is created where the number of regions, where the distance information which is calculated falls in the ranges of each of the classes, is the frequency; and
   controlling an aperture value and movement of the focus lens such that a parallax amount of an image region, which is a target of parallax adjustment, is a parallax amount within a predetermined range based on the distribution of the distance information.

19. A non-transitory computer readable recording medium recorded with a program causing a calculating device according to claim 1 to execute:
   acquiring a plurality of images by receiving light beams which each pass through different regions in a single imaging optical system which includes a focus lens;
   determining the distribution of distance information on subjects which are included in the plurality of images based on the plurality of images,
   wherein the distance information in a standard image which is one image out of a plurality of images is divided into a plurality of regions, the distance information for each of the plurality of divided regions is calculated, the distance information is divided into a plurality of classes for each distance range, and a histogram is created where the number of regions, where the distance information which is calculated falls in the ranges of each of the classes, is the frequency; and
   controlling an aperture value and movement of the focus lens such that a parallax amount of an image region, which is a target of parallax adjustment, is a parallax amount within a predetermined range based on the distribution of the distance information.

* * * * *